United States Patent
Borkholder

(10) Patent No.: US 10,633,039 B2
(45) Date of Patent: Apr. 28, 2020

(54) FIFTH WHEEL TO GOOSENECK TORSION SUSPENSION COUPLER

(71) Applicant: Carl J. Borkholder, Bremen, IN (US)

(72) Inventor: Carl J. Borkholder, Bremen, IN (US)

(73) Assignee: GEN-Y CREATIONS, LLC, Nappannee, IN (US)

( * ) Notice: Subject to any disclaimer, the term of this patent is extended or adjusted under 35 U.S.C. 154(b) by 147 days.

(21) Appl. No.: 15/909,052

(22) Filed: Mar. 1, 2018

(65) Prior Publication Data

US 2019/0031255 A1 Jan. 31, 2019

Related U.S. Application Data

(63) Continuation-in-part of application No. 15/661,758, filed on Jul. 27, 2017, now Pat. No. 10,343,470.

(51) Int. Cl.
| | |
|---|---|
| *B62D 53/08* | (2006.01) |
| *B60D 1/50* | (2006.01) |
| *B60D 1/24* | (2006.01) |
| *B60D 1/14* | (2006.01) |
| *B62D 53/06* | (2006.01) |

(52) U.S. Cl.
CPC ......... *B62D 53/0871* (2013.01); *B60D 1/143* (2013.01); *B60D 1/248* (2013.01); *B60D 1/50* (2013.01); *B62D 53/061* (2013.01); *B62D 53/0842* (2013.01)

(58) Field of Classification Search
CPC .................................. B60D 1/248; B60D 1/50
USPC ........................................................ 280/489
See application file for complete search history.

(56) References Cited

U.S. PATENT DOCUMENTS

| 4,147,376 | A | * | 4/1979 | Slazas | B62D 49/02 172/678 |
| 4,641,852 | A | * | 2/1987 | Kerst | B60D 1/50 280/489 |
| 6,454,019 | B1 | * | 9/2002 | Prairie | A01B 63/145 111/163 |

* cited by examiner

*Primary Examiner* — Kevin Hurley
*Assistant Examiner* — Felicia L. Brittman
(74) *Attorney, Agent, or Firm* — Botkin & Hall, LLP

(57) ABSTRACT

A torsion gooseneck coupler has a pin box that is designed to be affixed to an existing trailer. The pin box has a pin box torsion end and a lower assembly that each have a corresponding torsion bar. The torsion bars extend outwardly where each affixes to a corresponding torsion arm. The lower assembly is designed to affix to a towing vehicle. The lower assembly has an upper and a lower torsion tube that each has a corresponding torsion bar. The upper torsion arm affixes the upper torsion bar of the pin box assembly to the upper torsion bar of the lower assembly. Correspondingly, a lower torsion arm affixes the lower torsion bars of the pin box assembly to the lower assembly. The torsion tubes and bars resist rotation and cooperate to allow limited movement and provide resistance to forces along the axes of the upper and lower assemblies.

18 Claims, 24 Drawing Sheets

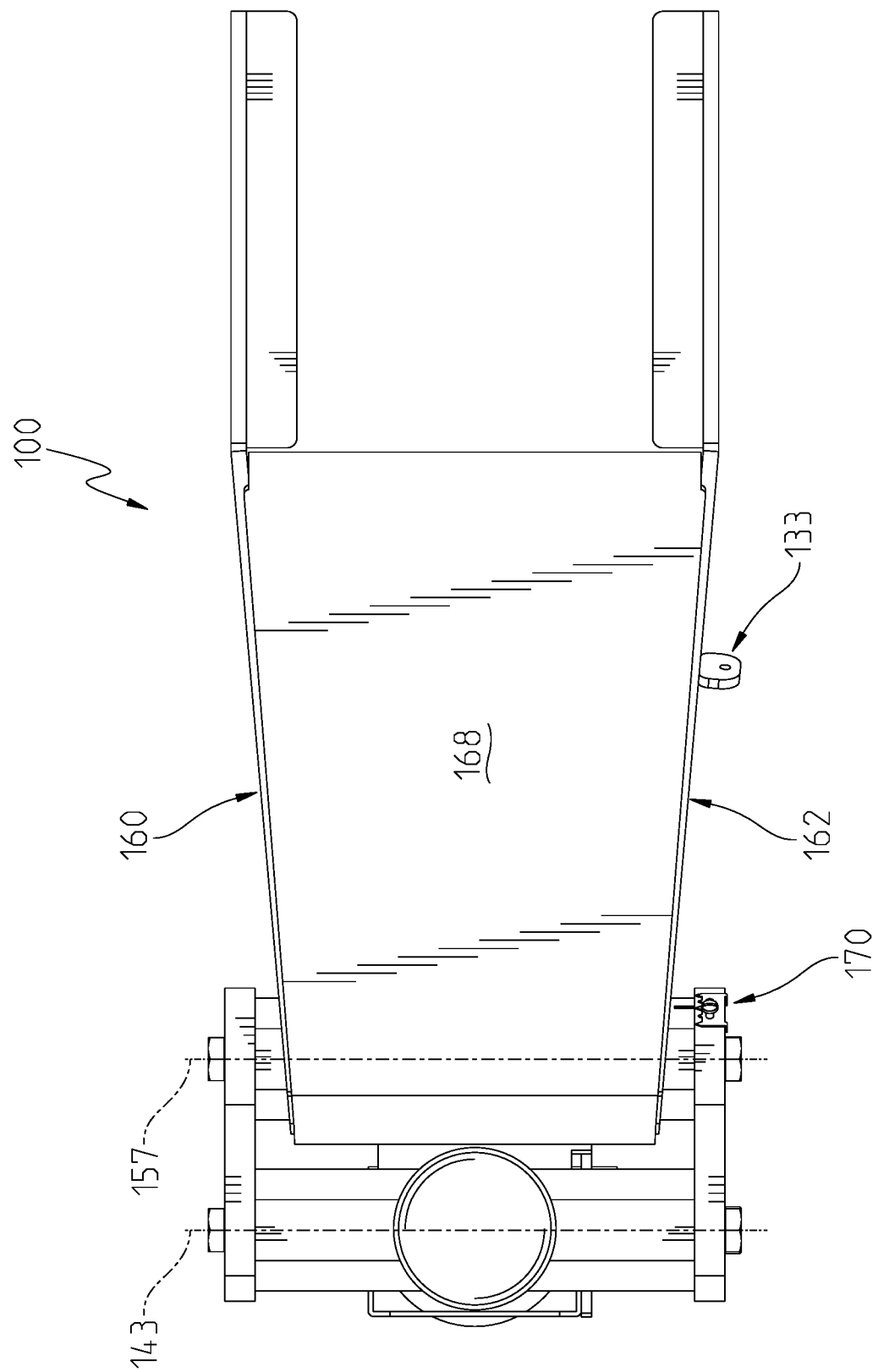

FIFTH WHEEL TO GOOSENECK TORSION SUSPENSION COUPLER

CROSS REFERENCE TO RELATED APPLICATIONS

This application is a Continuation-in-Part of U.S. application Ser. No. 15/661,758, filed Jul. 27, 2017, the disclosure of which is hereby incorporated by reference.

BACKGROUND OF THE INVENTION

This present disclosure relates to gooseneck hitch adapters and the attachment between a gooseneck trailer and a towing vehicle. Commonly, when being towed by a vehicle, the trailer is subject to transient forces as the towing vehicle pulls the trailer over various terrains or when loads are moved or placed on the trailer. Trailers have a tongue weight that is borne by the towing vehicle. With a gooseneck trailer, a significant amount of tongue weight is carried by the towing vehicle. Transient forces on the trailer can translate to transient tongue forces transmitted to the towing vehicle, at the very least, can be unsettling to the driver. In an extreme situation, the transient tongue forces can create a dangerous loss of control. Other trailers may use a pin box mounting with a kingpin but the user may desire using a gooseneck ball on the towing vehicle. Some users simply mount an adapter to the kingpin and then attach the adapter to the towing vehicle. The attaching of a separate adapter adds complexity and another point of failure and do not provide any ability to absorb transient forces. An improved gooseneck adapter that can be located between the trailer and the towing vehicle is necessary.

SUMMARY OF THE INVENTION

The present disclosure describes a torsion gooseneck coupler that will attach to a towing vehicle and absorb transient tongue loading either caused by the towing vehicle or the trailer. The device has an upper torsion assembly and a lower torsion assembly. The upper torsion assembly has two torsion tubes with corresponding torsion bars. The lower torsion assembly has two torsion tubes with corresponding torsion bars. The torsion bars resist rotation with respect to the torsion tubes. The torsion assemblies are coupled through torsion arms which are affixed to the ends of their respective torsion bars. The torsion bars and arms resist movement along the axes of the upper and lower torsion assembly and allow for limited relative vertical motion between the towing vehicle and the trailer. An optional load indicator affixed to the device provides a visual indicator of the vertical displacement between the upper and lower torsion assembly. The device further provides an offset for vehicles that have a short bed that desire the clearance of a longer bed vehicle.

An alternate embodiment is torsion gooseneck coupler that will attach to a towing vehicle and absorb transient tongue loading either caused by the towing vehicle or the trailer. The coupler has a lower assembly and a pin box assembly. The lower assembly has a first and second torsion tubes with corresponding torsion bars. The pin box assembly has third and fourth torsion tubes with corresponding torsion bars. Torsion arms are affixed to torsion arms to connect the lower assembly to the pin box assembly. The torsion tubes and torsion bars cooperate to bias the coupler to an unloaded position. The lower assembly and the pin box assembly have central axes that are vertically oriented when assembled to the towing vehicle and trailer. The central axes remain parallel as the coupler moves between the unloaded position and a loaded position.

BRIEF DESCRIPTION OF THE DRAWINGS

A preferred embodiment of this invention has been chosen wherein:

FIG. 16 is a top view of the Gooseneck Torsion Coupler;

DESCRIPTION OF THE PREFERRED EMBODIMENT

Figure 1:
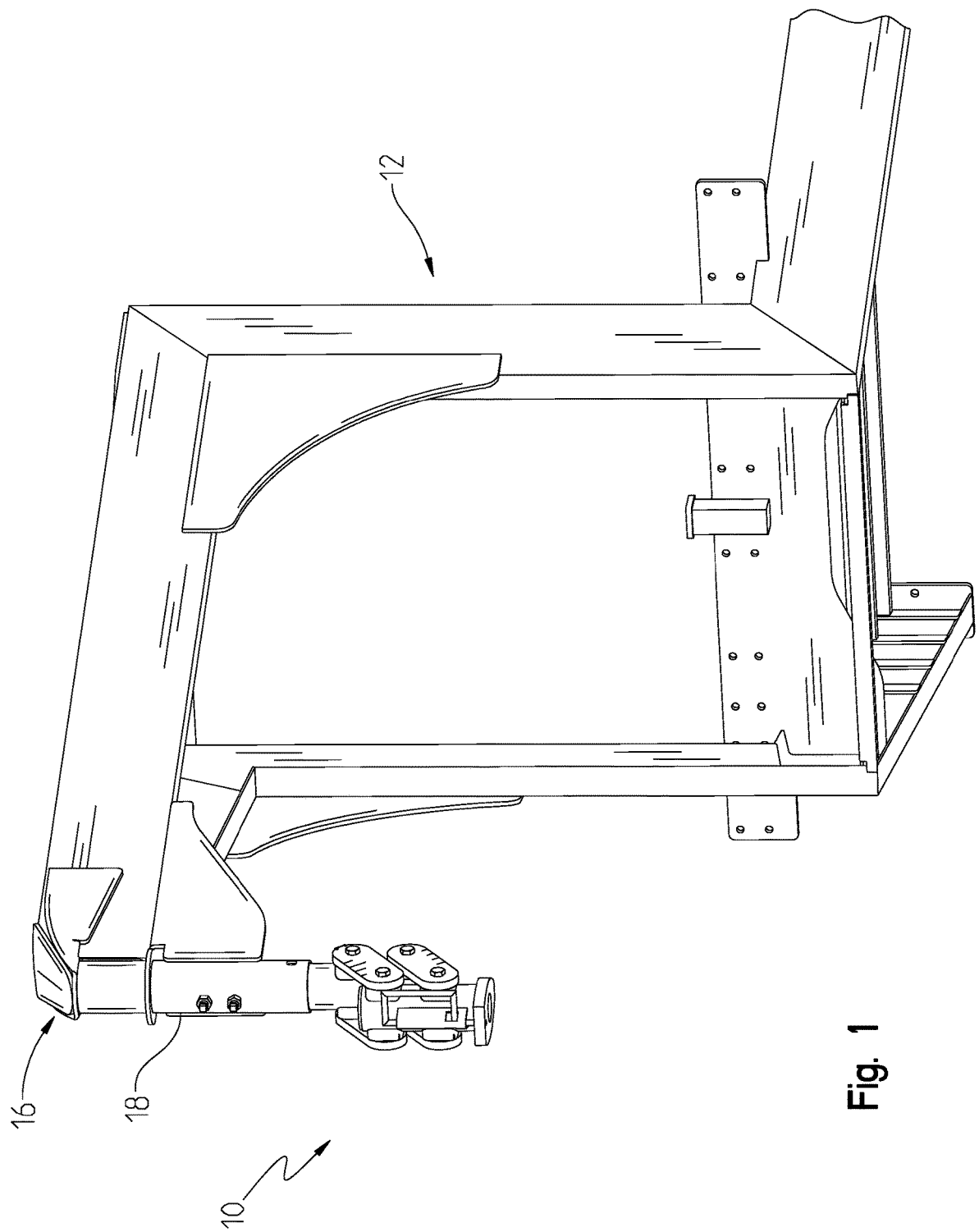
FIG. 1 is an isometric view of a gooseneck trailer with the coupler attached.
Figure 2:
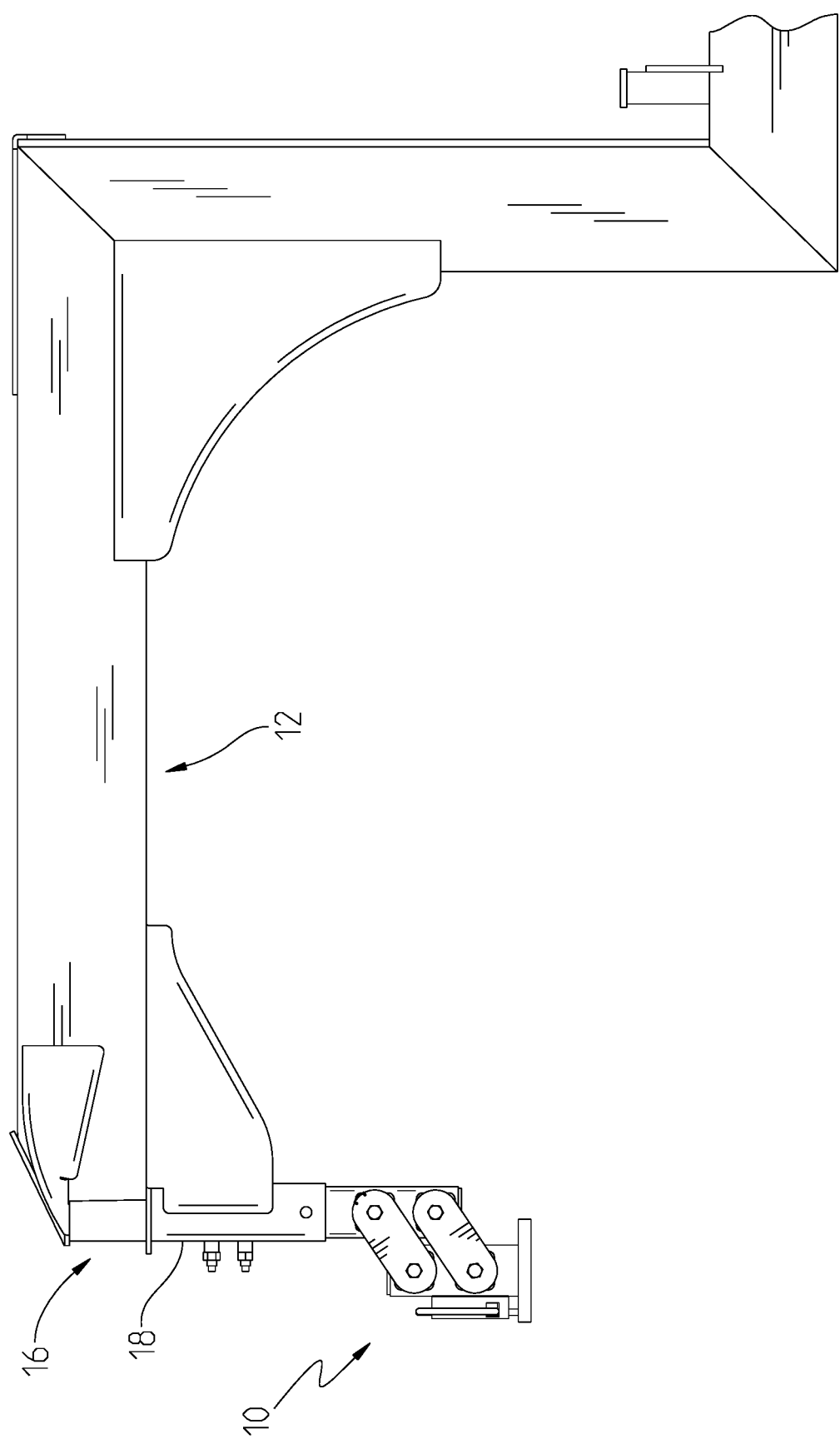
FIG. 2 is a left side view of the trailer as shown in FIG. 1.

As shown in FIG. 1, a trailer 12 uses a coupler 10 to affix the trailer 12 to a towing vehicle (not shown). Gooseneck trailers attached to towing vehicles are well-known in the art. The trailer 12 has a gooseneck end 16 with a tubular end 18. The tubular end 18 receives the coupler 10 where it is affixed to the trailer 12. The coupler 10 affixes to the towing vehicle using a ball and socket, where the ball is affixed to the vehicle, commonly above the rear axle. The coupler is affixed to the ball but allows some pivoting of the vehicle with respect to the trailer 12, as is well-known in the art. The coupler 10 carries the tongue weight of the trailer 12 and maintains the connection between the trailer 12 and the vehicle.

Figure 3:
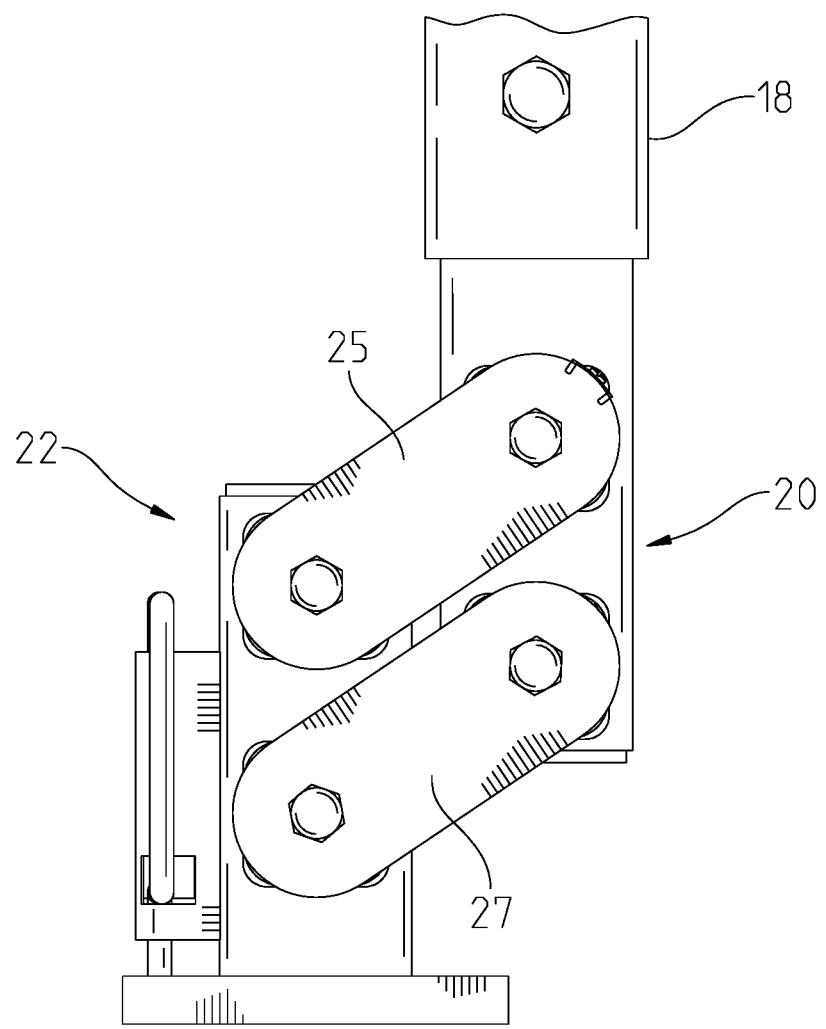
FIG. 3 is a left side view of the coupler.
Figure 4:
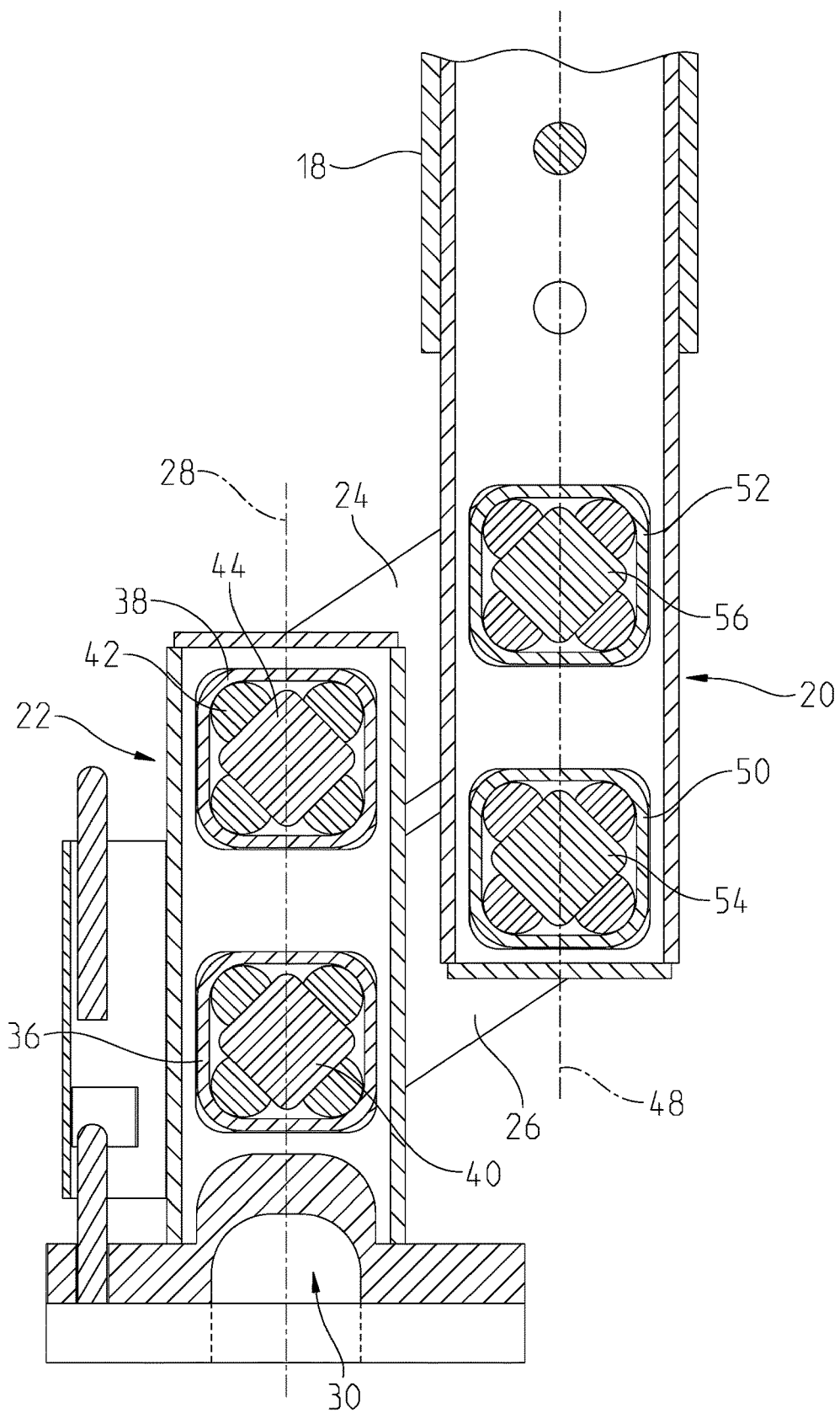
FIG. 4 is a left side section view of the coupler.
Figure 5:
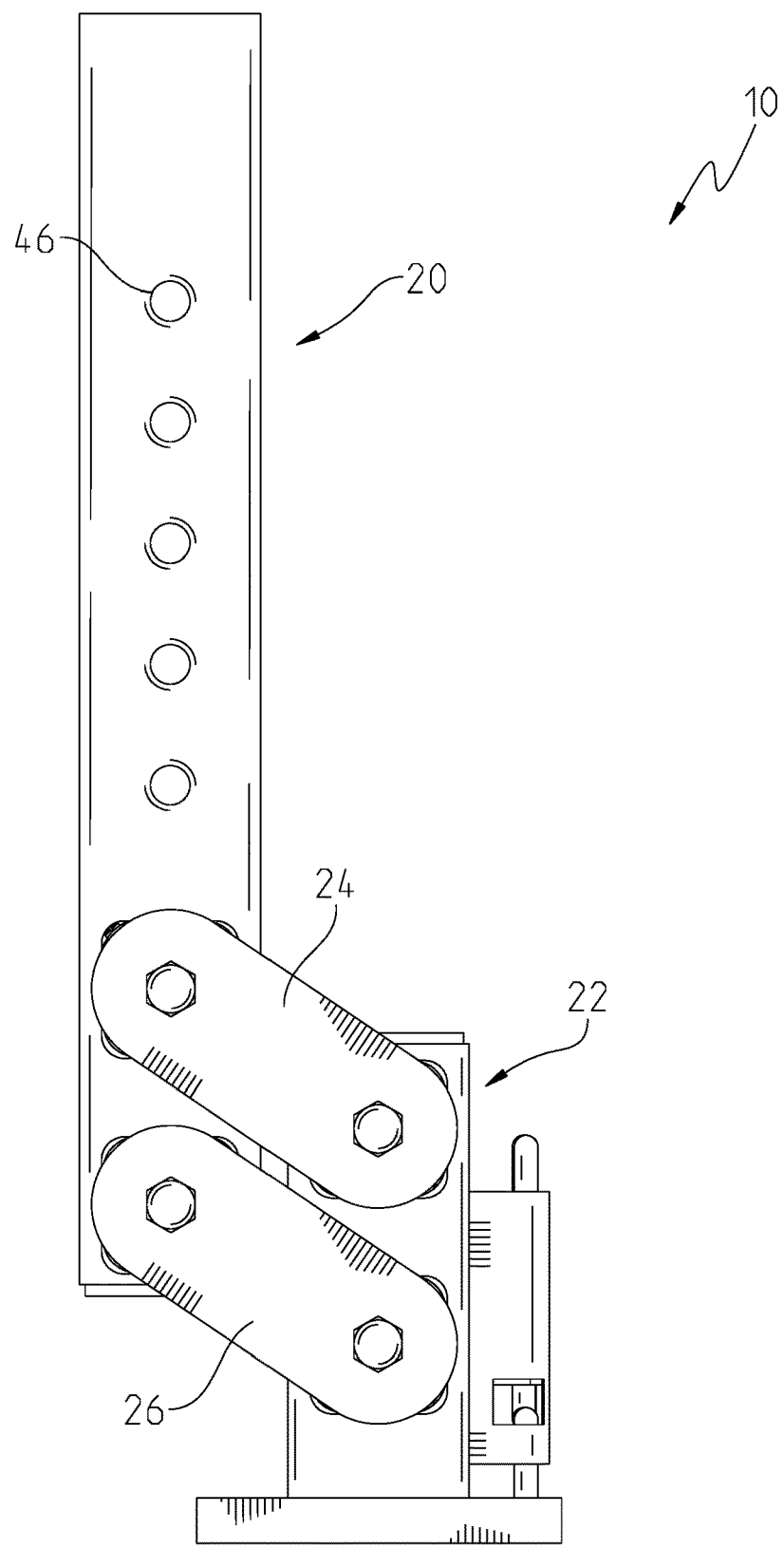
FIG. 5 is a right side view of the coupler.
Figure 6:
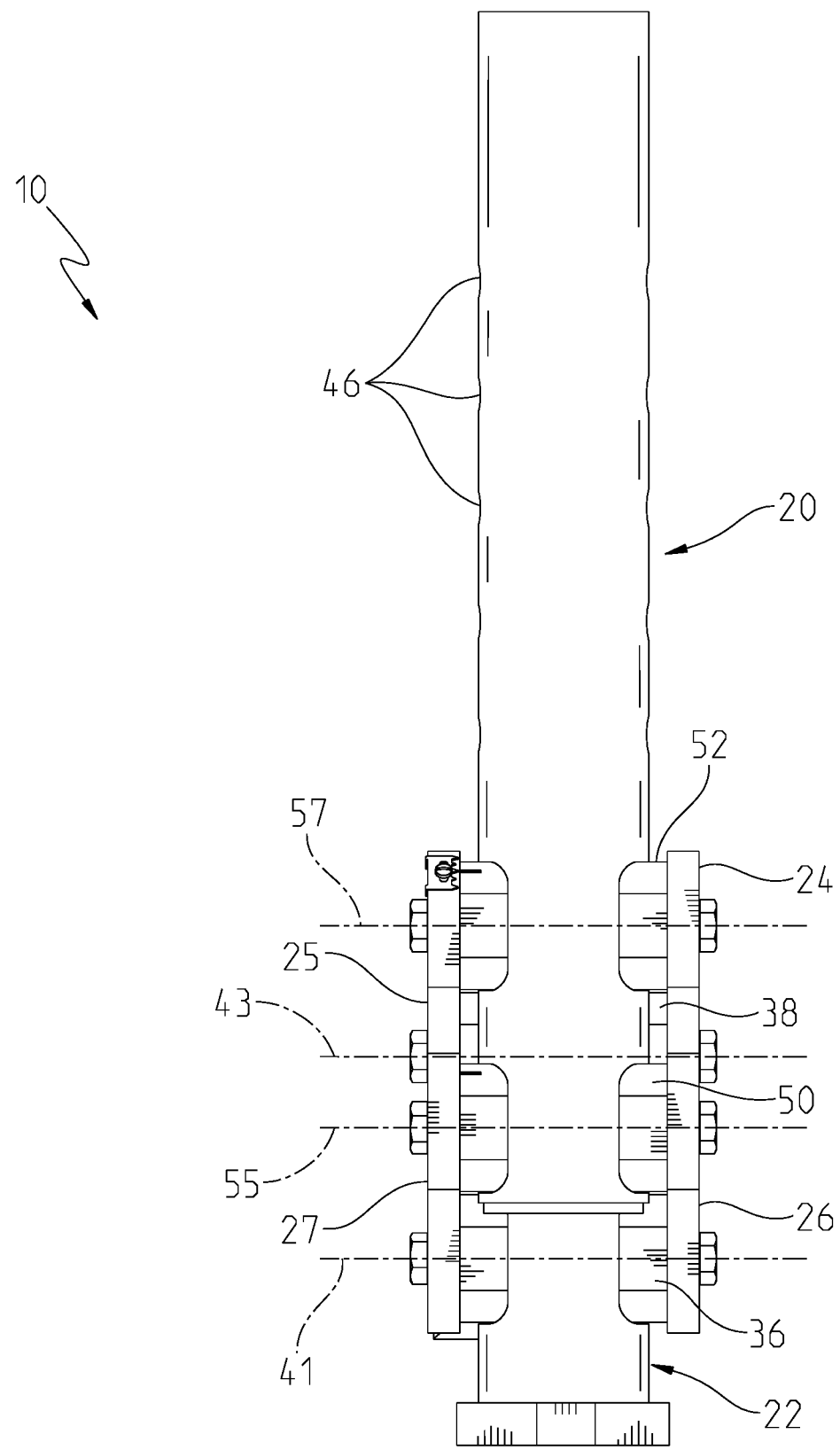
FIG. 6 is a rear view of the coupler.

The coupler 10, shown in FIGS. 3-5, has an upper portion 20 and a lower portion 22 that are coupled through arms 24, 26 on one side and 25, 27 on the opposite side. The lower portion 22 has a central axis 28 that extends along its length. At one end of the lower portion is the ball pocket 30 and a locking plate 32 which are used to mate the coupler 10 to a vehicle-mounted ball. As shown, the lower portion 22 is cylindrical but it is contemplated that a square, rectangular, beam, or other shape is used. A first torsion tube 36 is affixed to the lower portion 22 and extends through the center. A second torsion tube 38 is also affixed to the lower portion 22 and also extends through the center. The first torsion tube 36 and second torsion tube 38 are parallel. Located inside the first torsion tube 36 is a first torsion bar 40. The first torsion bar 40 is restrained in the first torsion tube 36 using resilient cords 42. The second torsion tube 38 has a corresponding second torsion bar 44. The torsion tubes and bars are shown in section view FIG. 4. The first torsion bar 40 rotates about a first axis 41 and the second torsion bar 44 rotates about a second axis 43. The axes 41, 43 are parallel. These axes are shown in FIG. 6. The axes 41, 43 intersect the central axis 28 but it is contemplated that they are offset therefrom.

Figure 8:
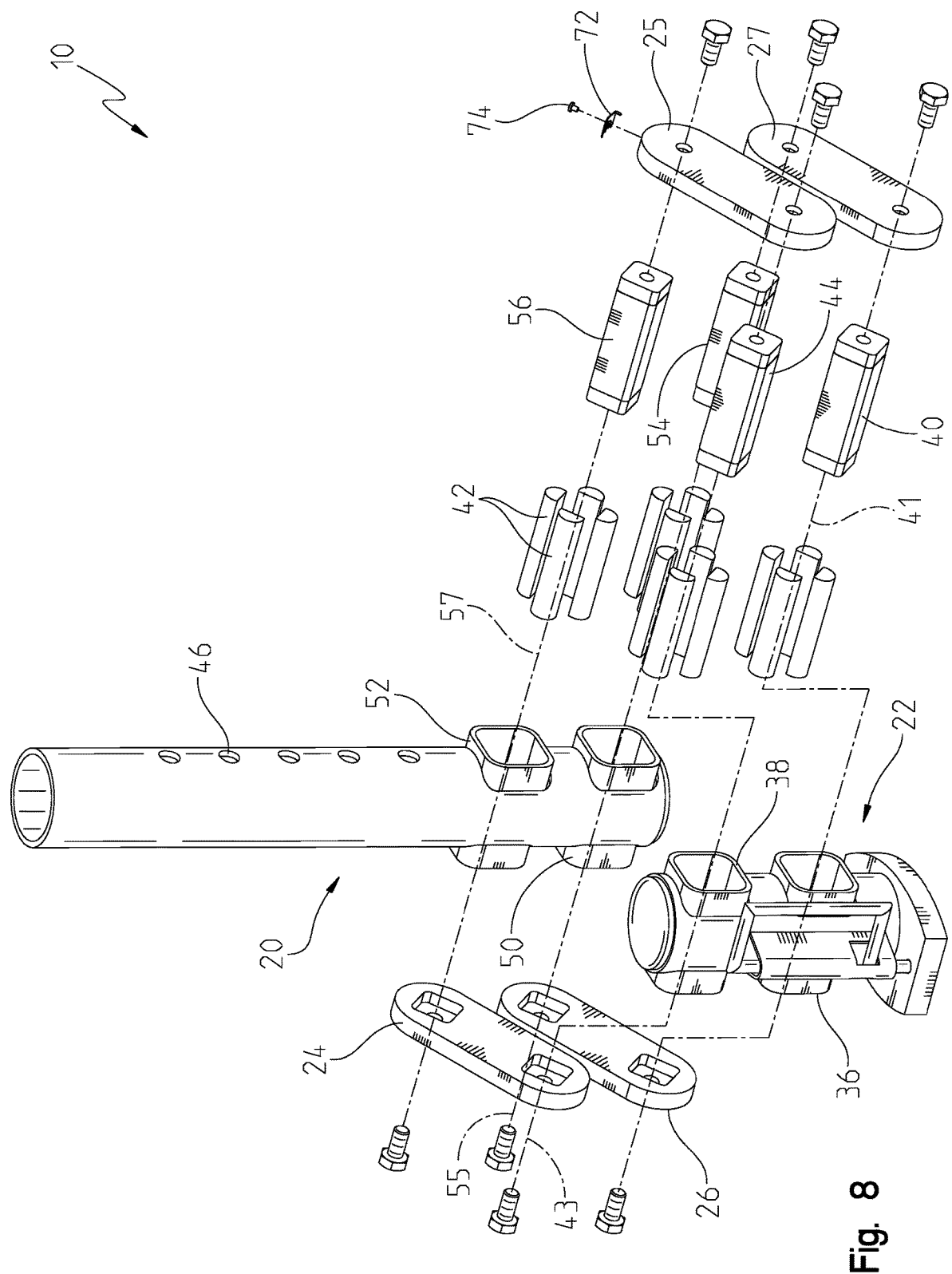
FIG. 8 is an exploded isometric view of the coupler.
Figure 9:
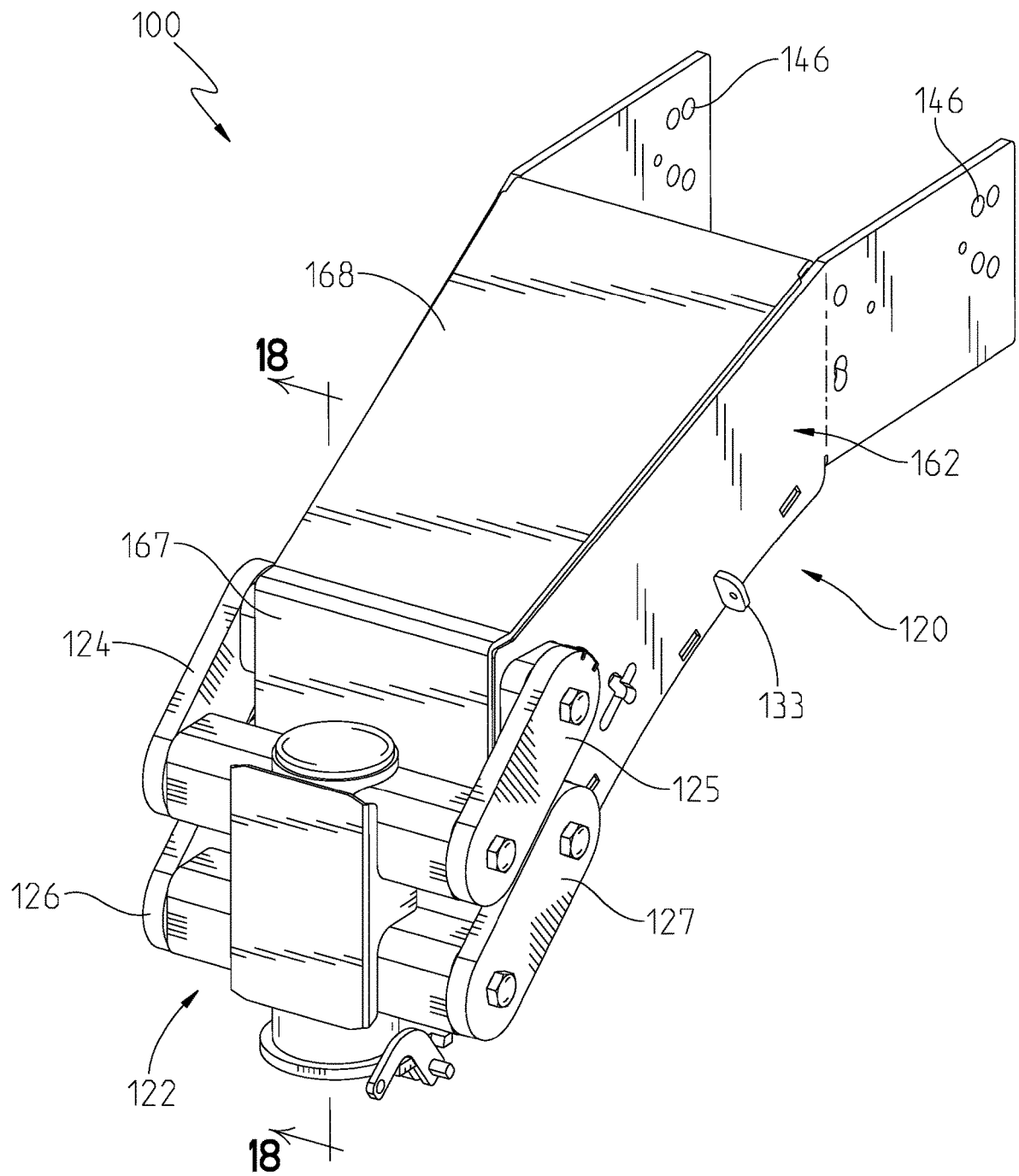
FIG. 9 is a front isometric view of the Gooseneck Torsion Coupler.
Figure 10:
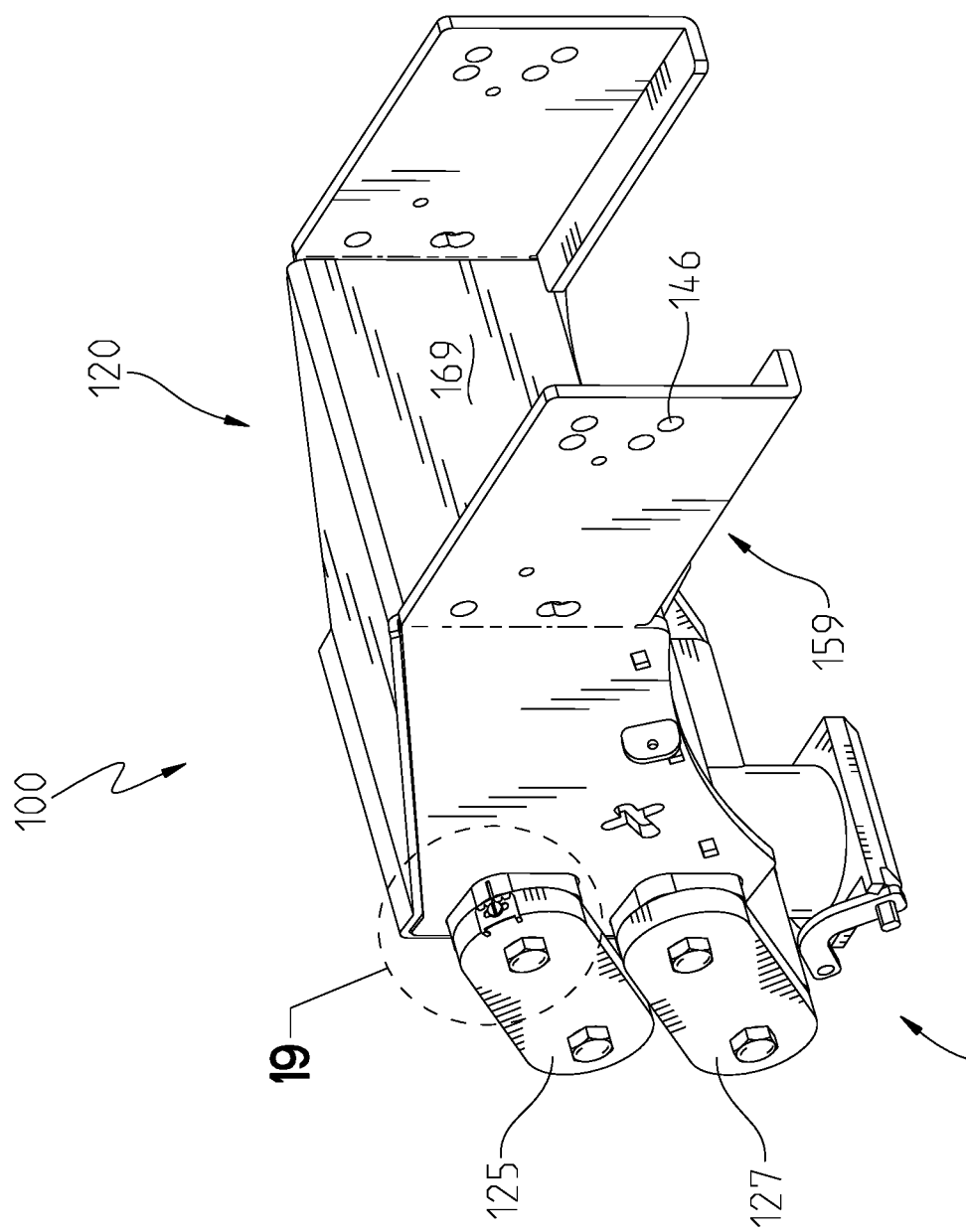
FIG. 10 is a rear isometric view of the Gooseneck Torsion Coupler of FIG. 9.
Figure 11:
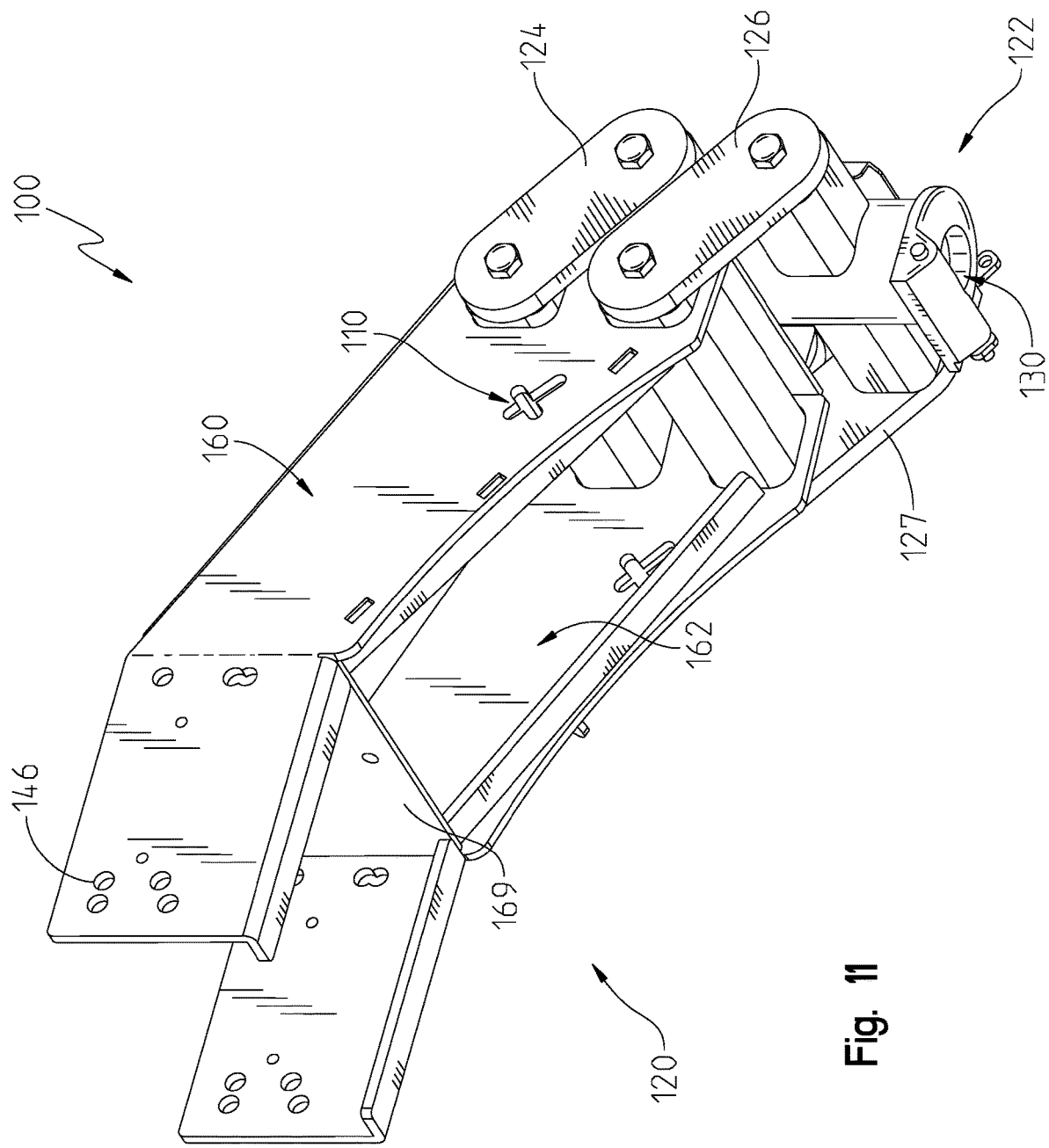
FIG. 11 is a bottom isometric view of the Gooseneck Torsion Coupler of FIG. 9.

The upper portion 20 has a central axis 48 that extends along its length and is parallel to the central axis 28 of the lower portion 22. At the upper end is a series of holes 46 where the tubular end 18 of the trailer 12 is affixed. The upper portion 20 is shown as a cylindrical tube but other shapes, such as square, are contemplated. It is further contemplated that the upper portion 20 and lower portion 22 are solid members or beams. A third torsion tube 50 is affixed to the upper portion 20 and extends through the center. Located above the third torsion tube 50 is a fourth torsion tube 52 that is also affixed to the upper portion 20. The third and fourth torsion tubes 50, 52 are parallel. The third torsion tube 50 carries a third torsion bar 54 and the fourth torsion tube 52 carries a fourth torsion bar 56. As with the first and second torsion tubes 36, 38, resilient cords 42 surround the torsion bars 54, 56 and restrain the rotation of their corresponding torsion bar. The resilient cords 42 compress the torsion bars and restrict the rotation of the torsion bar 40, 44, 54, 56 with respect to the corresponding torsion tube 36, 38, 50, 52. Resilient cords 42 being used with torsion bars and tubes are well-known in the art. The third torsion bar 54 rotates about a third axis 55 and the fourth torsion bar 56 rotates about a fourth axis 57. The axes 55, 57 are parallel. As shown, the axes 55, 57 intersect the central axis 48 but it is contemplated that they are offset therefrom. The section view in FIG. 4 and exploded diagram in FIG. 8 shows the relationship of the resilient cords 42, torsion bars 40, 44, 54, and 56, torsion tubes 36, 38, 50, and 52, arms 24, 25, 26, and 27.

Torsion arms 24, 25 are connected on one end to the fourth torsion bar 56 and the opposite end is connected to the second torsion bar 44. Correspondingly, torsion arms 26, 27 are connected on one end to the first torsion bar 40 and the opposite end is connected to the third torsion bar 54. The torsion arms 24, 25, 26, 27 are equal in length. The torsion arms are securely affixed to the torsion bars using bolts, screws, welding, pressing, or another method common in the art but not specifically described herein. The spacing of the first, second, third, and fourth axes and equal length of the torsion arms allow axial movement of the upper portion 20 with respect to the lower portion 22. Because each torsion bar resists rotation with respect to its corresponding torsion tube, the coupler 10 is constantly urged toward an unloaded position. As downward force is exerted on the coupler 10 through central axis 48 by the trailer 12, the torsion arms 24, 25, 26, 27 begin to rotate simultaneously with the torsion bars 40, 44, 54, and 56. The central axis 28 will begin to move away from central axis 48 as the torsion arms rotate to a more horizontal position. The greater the axial force on the coupler 10, the more horizontal the arms become. The FIGS. show the coupler 10 in an unloaded position.

Figure 7:
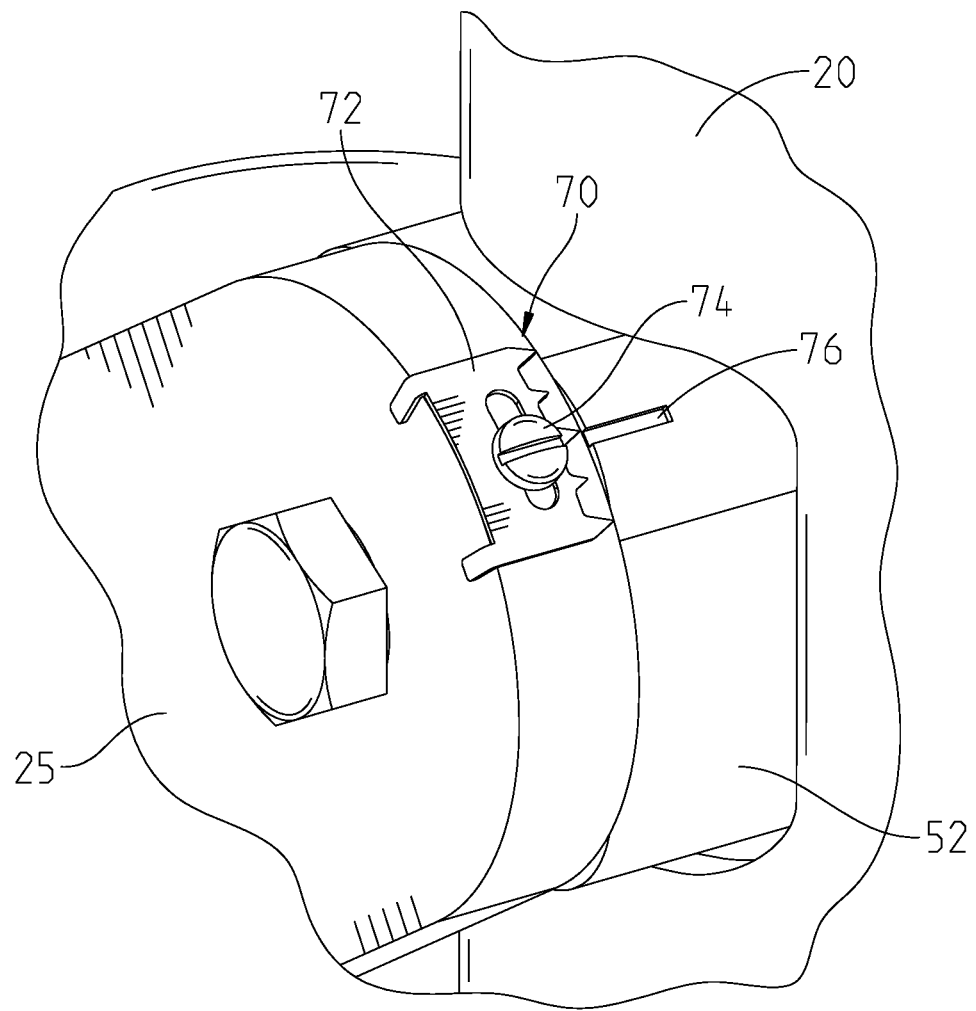
FIG. 7 is an isometric partial view of the load indicator portion of the coupler.

An optional load indicator 70, shown in FIG. 7, is affixed to one of the torsion arms 24, 25, 26, 27. The load indicator 70 has a moving portion 72 that is affixed to the arm with a fastener 74. The moving portion 72 is adjustable by loosening the fastener 74 and sliding the moving portion to the desired position. The adjacent torsion tube 36, 38, 50, 52 includes a reference line 76 for the user to reference and measure the amount rotation of the torsion arms and therefore the amount of axial displacement between the upper portion 20 and the lower portion 22. As installed, the central axis 48 is located rearward compared to central axis 28. This provides an offset rearward to the trailer 12.

An alternate embodiment is shown in FIGS. 9-17. The coupler 100 is attached to a trailer frame (not shown) and allows the trailer to be affixed to the towing vehicle using a ball and socket, where the ball is affixed to the vehicle, commonly above the rear axle. The coupler 100 is affixed to the ball but allows some pivoting of the vehicle with respect to the trailer, as is well-known in the art. The coupler 100 carries the tongue weight of the trailer and maintains the connection between the trailer and the vehicle.

Figure 20:
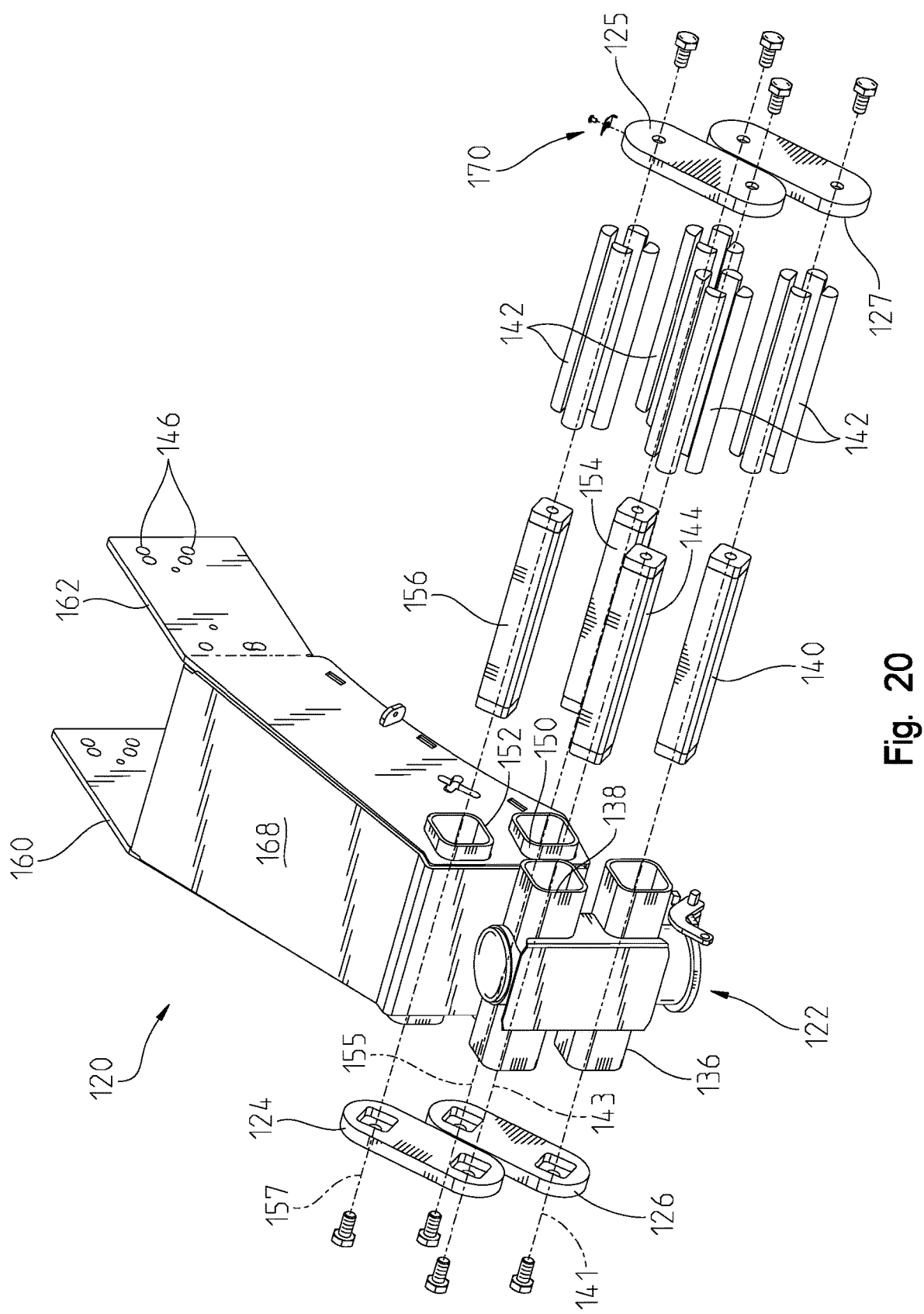
FIG. 20 is an exploded isometric view of the Gooseneck Torsion Coupler of FIG. 9.

The coupler 100, shown in FIGS. 9-17, has a pin box assembly 120 and a lower portion 122 that are coupled through arms 124, 126 on one side and 125, 127 on the opposite side. The lower portion 122 has a central axis 128 that extends along its length. At one end of the lower portion 122 is the ball pocket 130 which is used to mate the coupler 100 to a vehicle-mounted ball. The ball pocket 130 includes a shaft 132 that is connected to a lever 134. The ball pocket 130, shaft 132, and lever 134 shows an auto latching design, but other designs are contemplated. The side plate 162 contains a release cable guide 133, where a cable (not shown) is connected to the lever 134 for locking and releasing the lower portion 122 with respect to the vehicle-mounted ball (not shown). As shown, the lower portion 122 is cylindrical but it is contemplated that a square, rectangular, beam, or other shape is used. A first torsion tube 136 is affixed to the lower portion 122 and extends through the center. A second torsion tube 138 is also affixed to the lower portion 122 and also extends through the center. The first torsion tube 136 and second torsion tube 138 are parallel. Located inside the first torsion tube 136 is a first torsion bar 140. The first torsion bar 140 is restrained in the first torsion tube 136 using resilient cords 142. The second torsion tube 138 has a corresponding second torsion bar 144. The torsion tubes and bars are shown in section view FIG. 18. The first torsion bar 140 rotates about a first axis 141 and the second torsion bar 144 rotates about a second axis 143. The axes 141, 143 are parallel. These axes are shown in FIG. 20. The axes 141, 143 intersect the central axis 128 but it is contemplated that they are offset therefrom.

Figure 18:
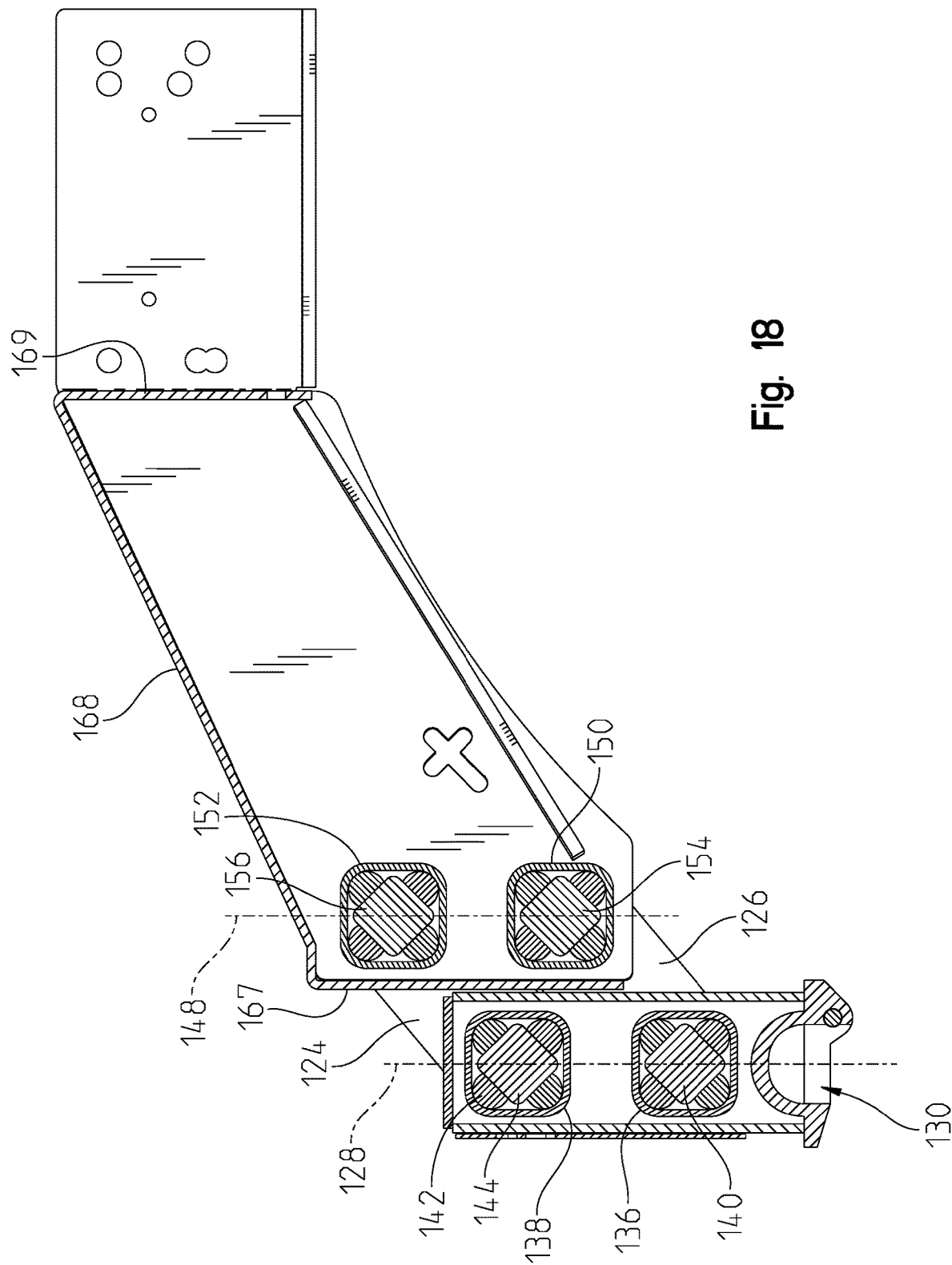
FIG. 18 is section view 18-18 of the Gooseneck Torsion Coupler of FIG. 9.

The pin box assembly 120 has a central pin box axis 148 that extends parallel to the central axis 128 of the lower portion 122. The pin box assembly 120 has sides 160, 162 that extend from a torsion end 158 to the mounting end 159. The sides 160, 162 contain safety chain apertures 110 that allow a safety chain (not shown) to pass through and become trapped to constrain the trailer in the event of a failure of the ball coupling or other mechanical disconnection between the towing vehicle and the pin box assembly 120. At the mounting end 159 is a series of holes 146 where the coupler 100 is bolted to the trailer frame mounting (not shown). The pin box assembly 120 has a top plate 164 with a front wall portion 167 extending to a center wall portion 168 that extends to a rear wall portion 169. As shown in FIG. 18, the front wall portion 167 is parallel to the rear wall portion 169. The pin box assembly 120 is shown as a series of flat plates that are affixed together, commonly through welding. Other shapes, such as square, tubular, or beam, and attachment methods, such as stamping, riveting, crimping, or brazing are contemplated. It is further contemplated that the pin box assembly 120 and lower portion 122 are solid members. A third torsion tube 150 is affixed to the pin box portion 120. Located above the third torsion tube 150 is a fourth torsion tube 152 that is also affixed to the pin box assembly 120. The third and fourth torsion tubes 150, 152 are parallel. The third torsion tube 150 carries a third torsion bar 154 and the fourth torsion tube 152 carries a fourth torsion bar 156. As with the first and second torsion tubes 136, 138, resilient cords 142 surround the torsion bars 154, 156 and restrain the rotation of their corresponding torsion bar. The resilient cords 142 compress the torsion bars and restrict the rotation of the torsion bar 140, 144, 154, 156 with respect to the corresponding torsion tube 136, 138, 150, 152. Resilient cords 142 being used with torsion bars and tubes are well-known in the art. The third torsion bar 154 rotates about a third axis 155 and the fourth torsion bar 156 rotates about a fourth axis 157. The axes 155, 157 are parallel. As shown, the axes 155, 157 are aligned with the central axis 148 but it is contemplated that they are offset therefrom. The section view in FIG. 18 and exploded diagram in FIG. 20 shows the relationship of the resilient cords 142, torsion bars 140, 144, 154, and 156, torsion tubes 136, 138, 150, and 152, arms 124, 125, 126, and 127.

Figure 21:
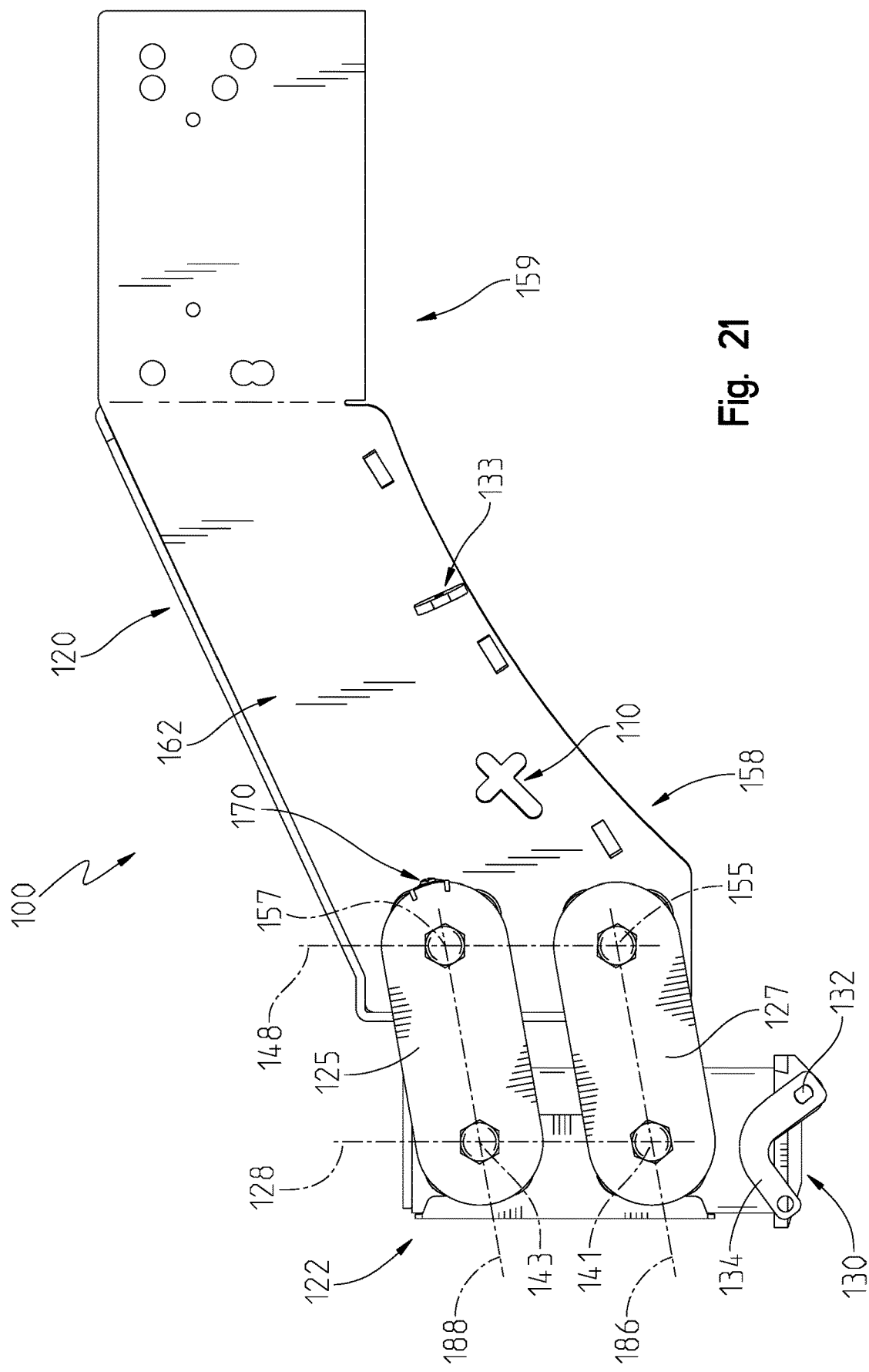
FIG. 21 is a right side view of the Gooseneck Torsion Coupler as shown in FIG. 12, in the loaded position.
Figure 22:
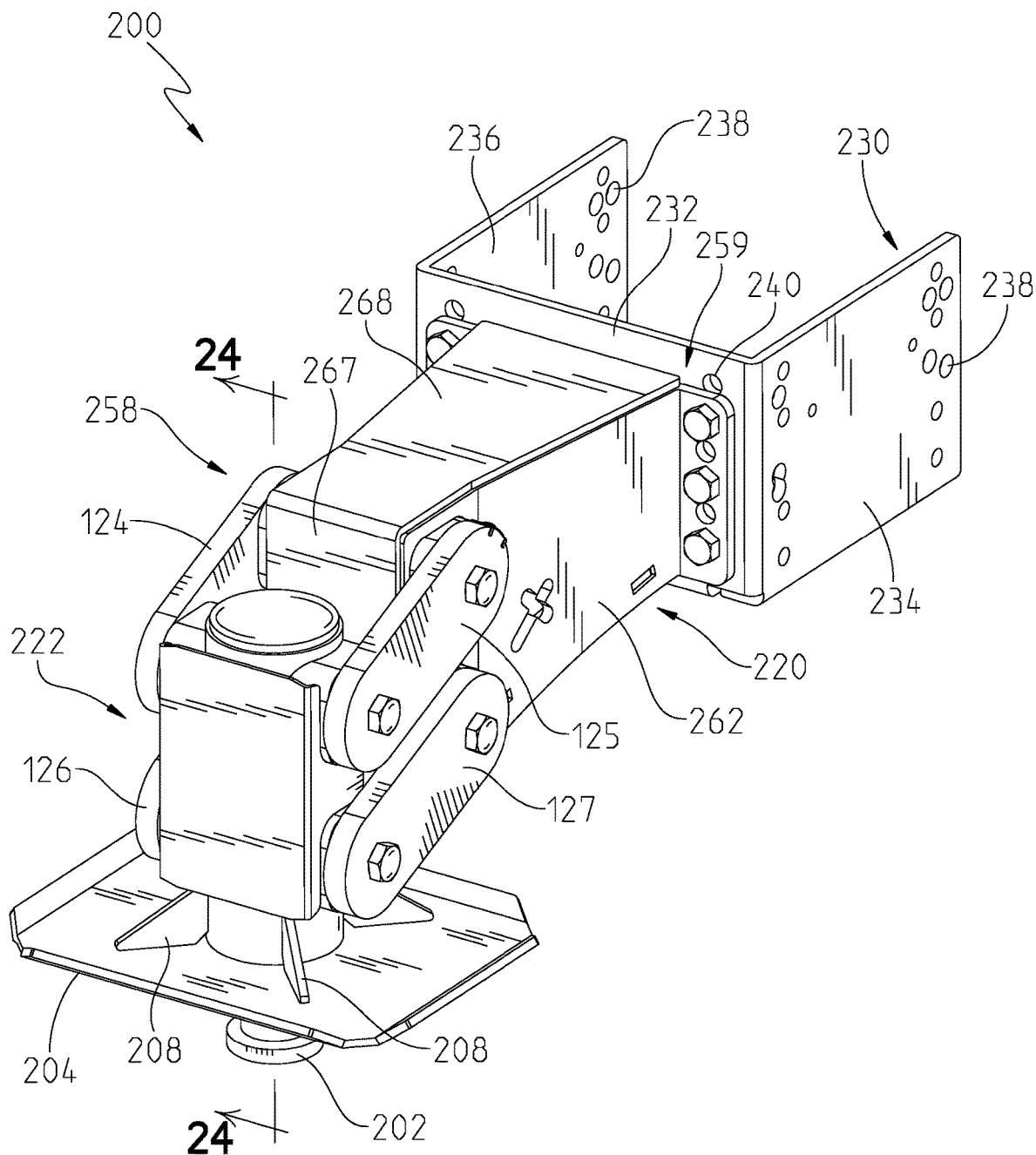
FIG. 22 is a front isometric view of an alternate embodiment of the torsion coupler with a king pin.

Torsion arms 124, 125 are connected on one end to the fourth torsion bar 156 and the opposite end is connected to the second torsion bar 144. Correspondingly, torsion arms 126, 127 are connected on one end to the first torsion bar 140 and the opposite end is connected to the third torsion bar 154. The torsion arms 124, 125, 126, 127 are equal in length. The torsion arms are securely affixed to the torsion bars using bolts, screws, welding, pressing, or another method common in the art but not specifically described herein. The spacing of the first 141, second 143, third 155, and fourth 157 axes and equal length of the torsion arms allow axial movement of the pin box assembly 120 with respect to the lower portion 122. Because each torsion bar resists rotation with respect to its corresponding torsion tube, the coupler 100 is constantly urged toward an unloaded position. As downward force is exerted on the coupler 100 through central axis 148 by the trailer, the torsion arms 124, 125, 126, 127 begin to rotate simultaneously with the torsion bars 140, 144, 154, and 156. The central axis 128 will begin to move away from central axis 148 as the torsion arms rotate to a more horizontal position. This is shown in FIG. 21 with representative line 186 that intersects axes 141, 155 and representative line 188 that intersects axes 143, 157. The greater the downward axial force on the coupler 100, the more horizontal the arms become. FIGS. 1-20 show the coupler 100 in an unloaded position. In the unloaded position, the lower portion 122 is close to the front wall portion 167, and as the coupler 100 moved towards the loaded position, the lower portion 122 remains parallel but increases in distance from the front wall portion 167. Even in the loaded position, the representative lines 186, 188 remain at an angle. Because the torsion arms remain at an angle, the coupler 100 also absorbs a percentage of the force perpendicular to axes 128, 148.

Figure 12:
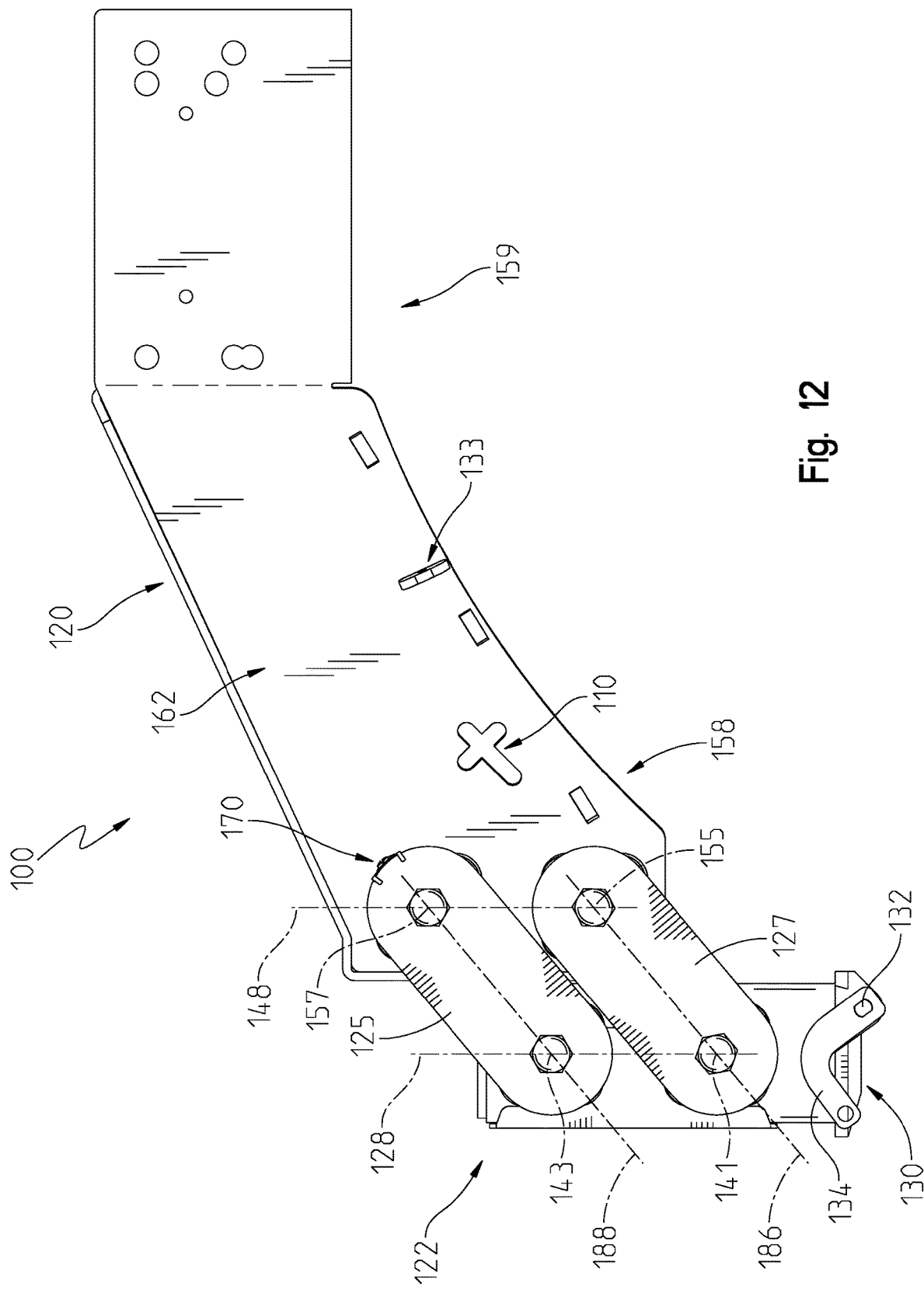
FIG. 12 is a right side view of the Gooseneck Torsion Coupler of FIG. 9.
Figure 13:
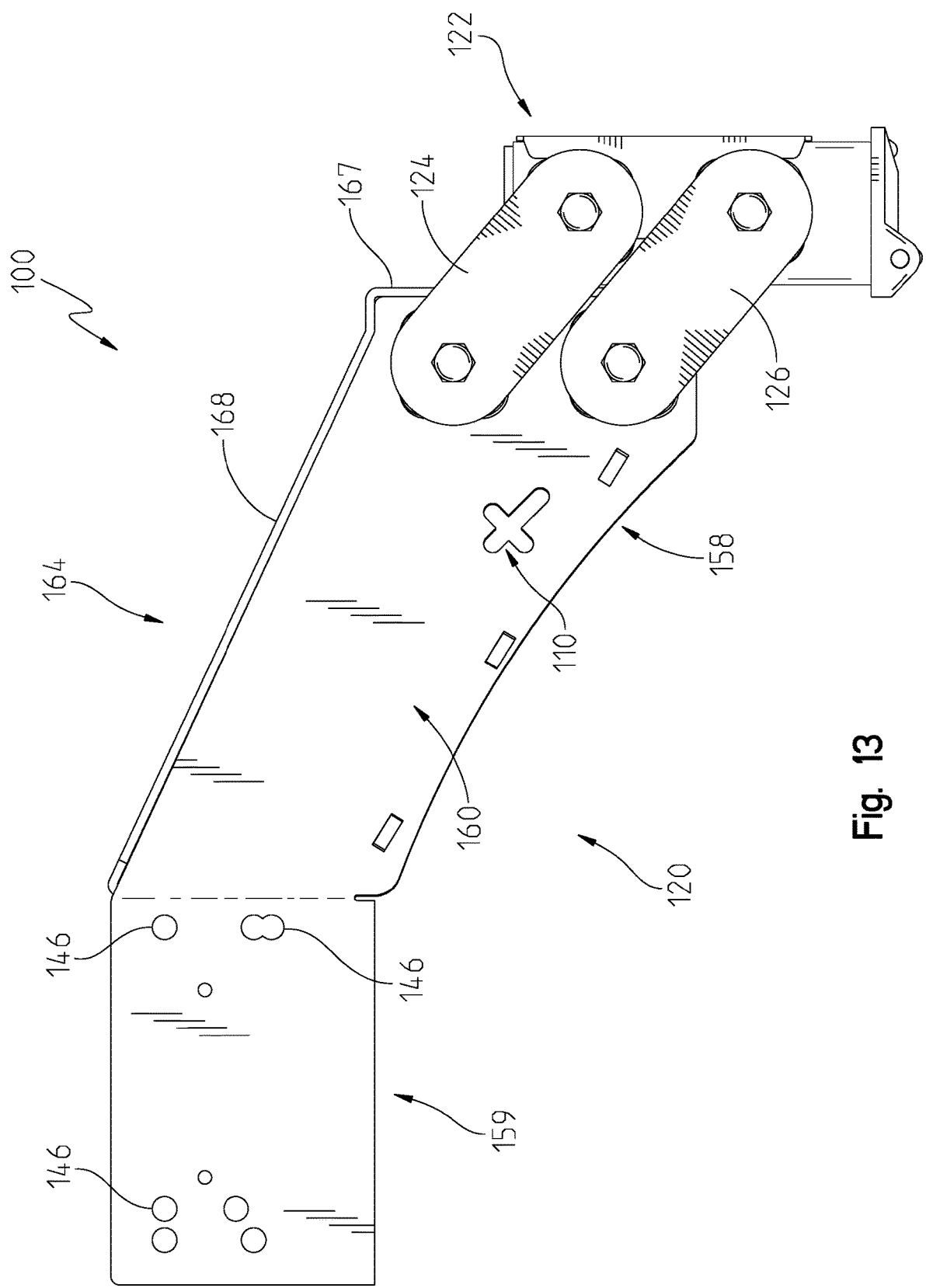
FIG. 13 is a left side view of the Gooseneck Torsion Coupler of FIG. 9.
Figure 15:
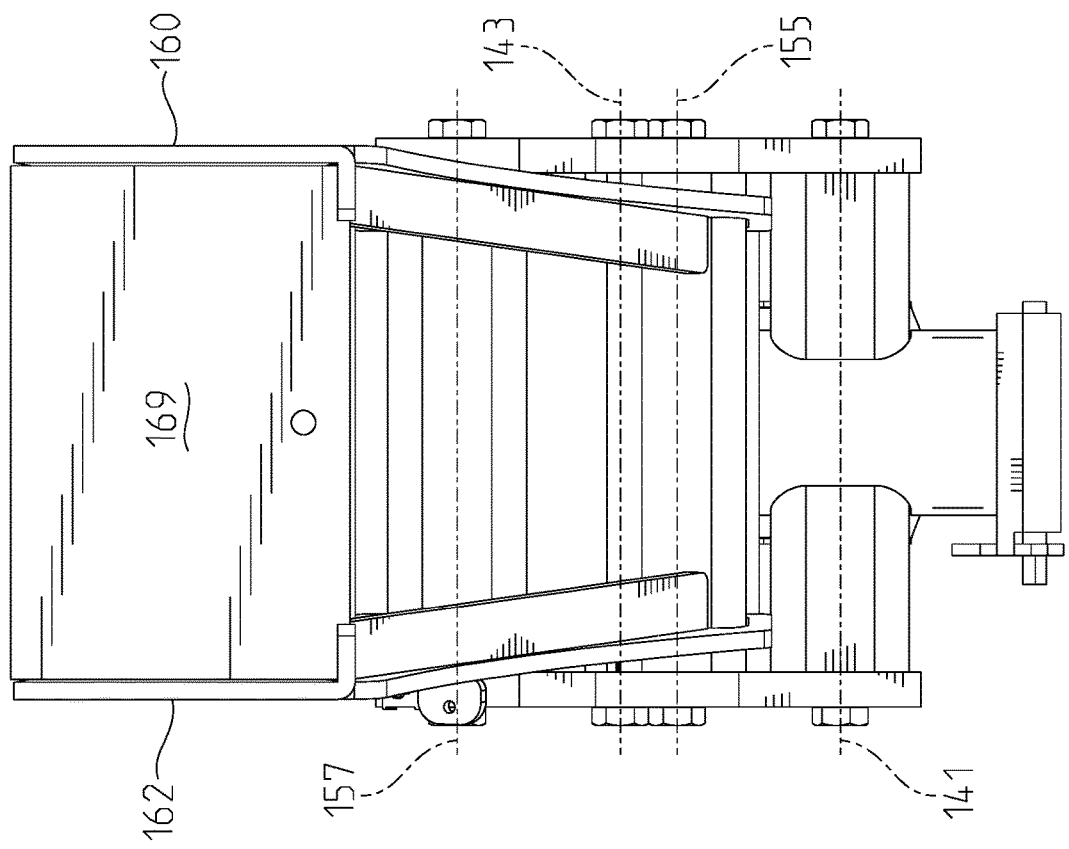
FIG. 15 is a rear view of the Gooseneck Torsion Coupler.
Figure 14:
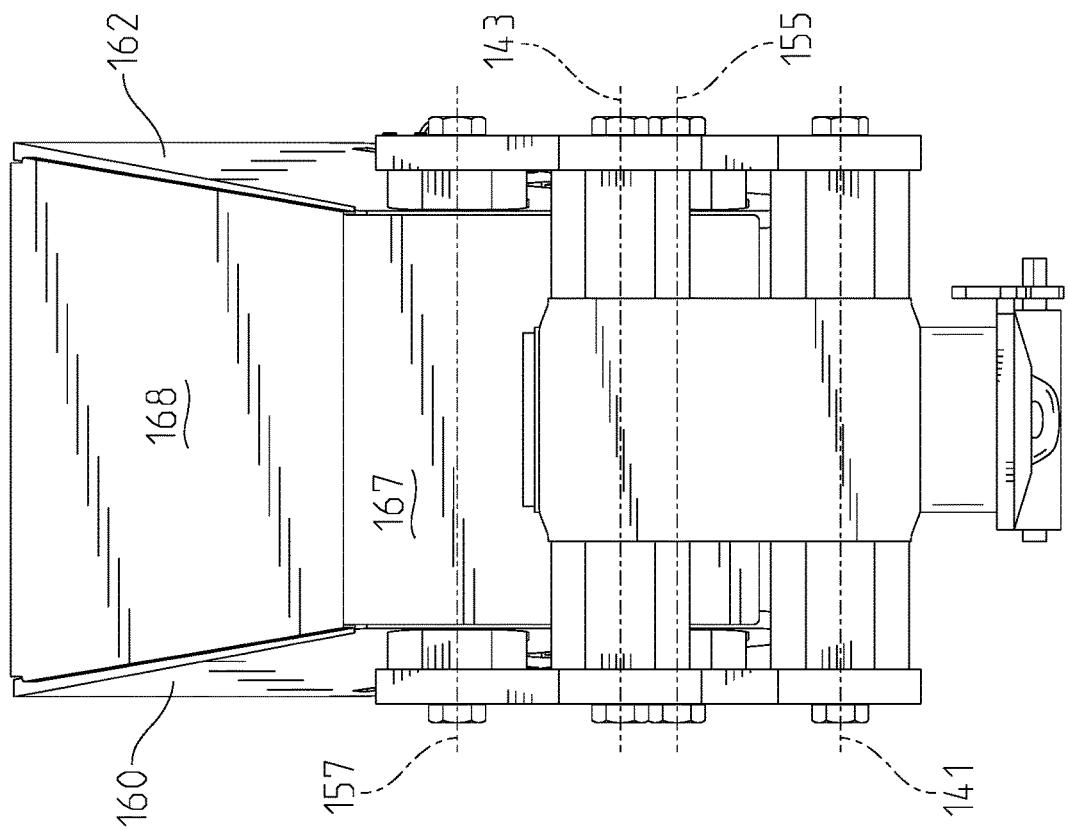
FIG. 14 is a front view of the Gooseneck Torsion Coupler of FIG. 9.
Figure 17:
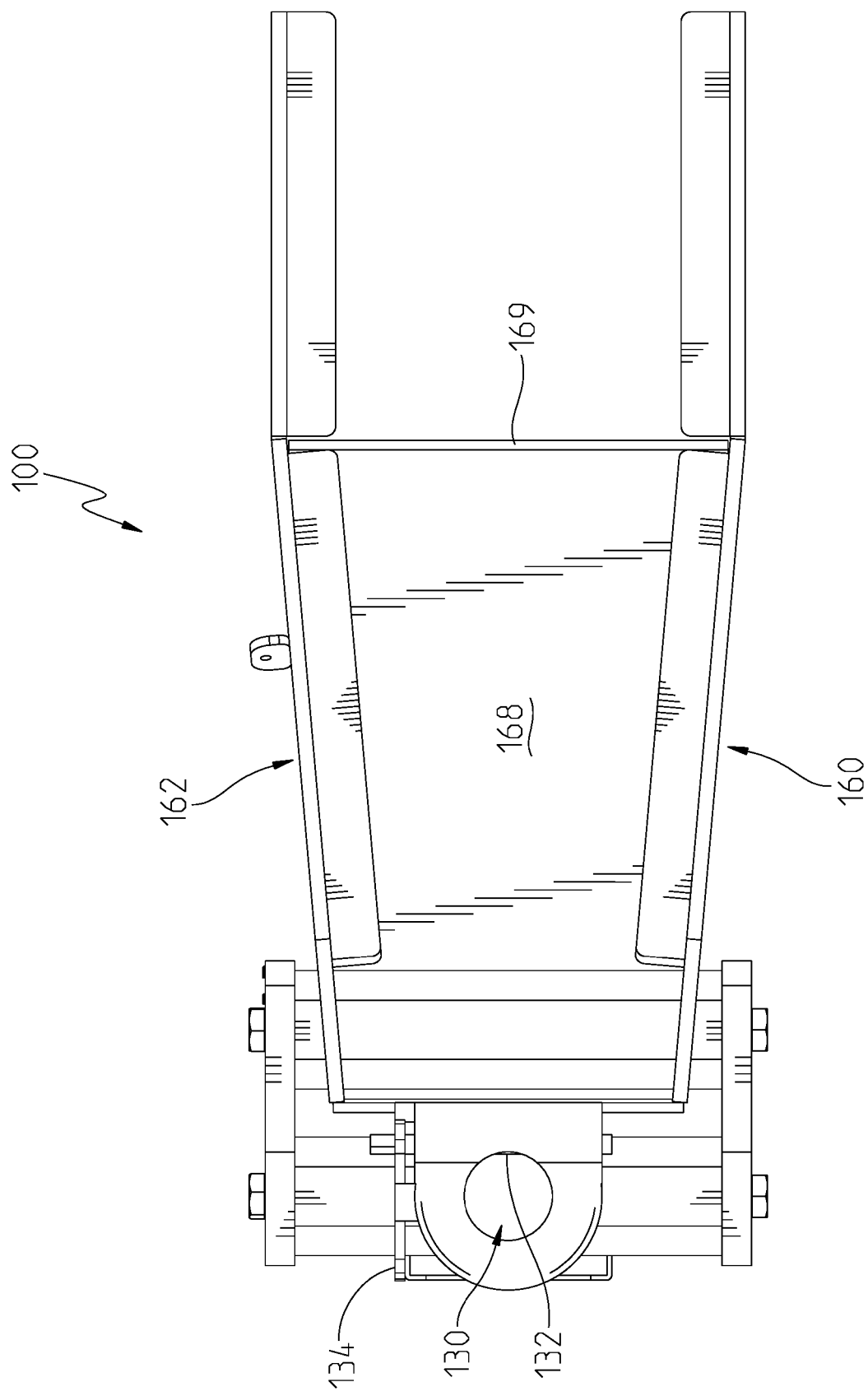
FIG. 17 is a bottom view of the Gooseneck Torsion Coupler.

All forces between the pin box assembly 120 and the lower assembly 122 are transferred through the torsion arms 124, 125, 126, 127. Because the torsion arms 124,125,126, 127 are rigid, the spacing of one axis remains at a fixed distance to an adjacent axis. As an example, torsion arms 124 and 125 maintain the spacing between axis 142 and 157, torsion arms 126 and 127 maintain the spacing between axis 141 and 155. The lower portion 122 maintains the spacing between axis 141 and 143, and the torsion end 158 of the pin box assembly 120 maintains the spacing between axis 155 and 157. This is shown in FIG. 12 where axes 141, 143, 155, 157 extend through the center of a corresponding bolt.

The torsion tubes 136, 138, 150, 152 carry a corresponding torsion bar 140, 144, 154, 156. Terminal ends of the torsion bars extend beyond the ends of their corresponding torsion tube. As shown in FIG. 20, the torsion bars 140, 144, 154, 156 are longer than the corresponding tubes 136, 138, 150, 152 that they reside in, so as assembled, the ends stick out on either side. The torsion arms 124, 125, 126, 127 have corresponding pockets 129 that receive the ends of the torsion bars. A bolt 131 extends through an aperture in the torsion arm and affixes the torsion arm to the corresponding torsion bar by threading into a threaded hole in the end of its respective torsion bar. The pockets 129 closely correspond to the outside shape of the end of the torsion bars. By having a shape that receives the terminal end of the torsion bars, torque and other forces between the torsion bars and torsion arms are carried by the bolts 131 and the interfaces between the pockets 129 and the ends of the torsion bars.

Figure 19:
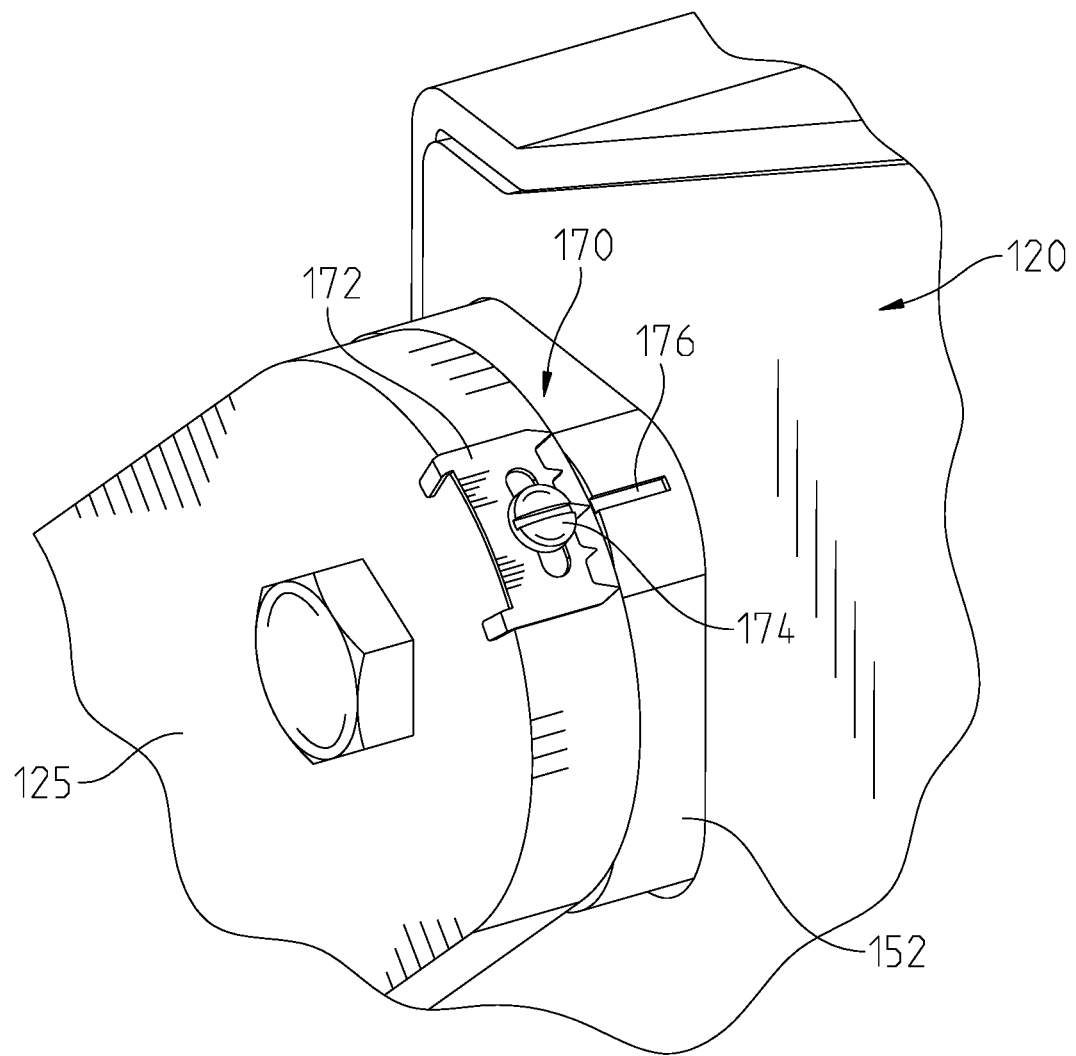
FIG. 19 is a partial view 19 of the Gooseneck Torsion Coupler of FIG. 10.

An optional load indicator 170, shown in FIG. 19, is affixed to one of the torsion arms 124, 125, 126, 127. The load indicator 170 has a moving portion 172 that is affixed to one of the arms with a fastener 174. The moving portion 172 is adjustable by loosening the fastener 174 and sliding the moving portion 172 to the desired position. The adjacent torsion tube 136, 138, 150, or 152 includes a reference line 176 for the user to reference and measure the amount rotation of the torsion arms 124, 125, 126, 127 and therefore the amount of axial displacement between the pin box assembly 120 and the lower portion 122. As installed, the central axis 148 is located rearward compared to central axis 128.

Figure 23:
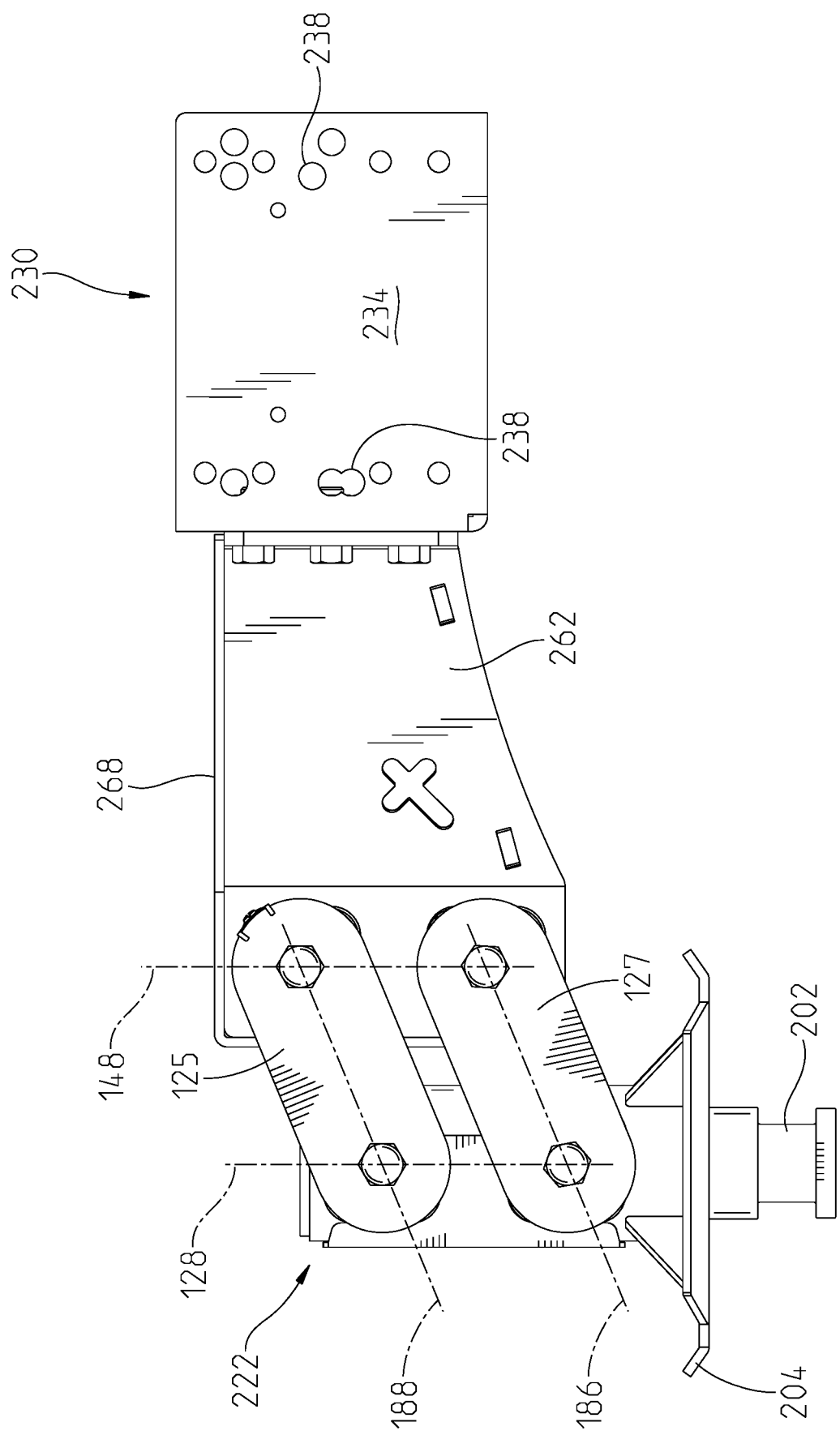
FIG. 23 is a side view of the torsion coupler in FIG. 22.
Figure 24:
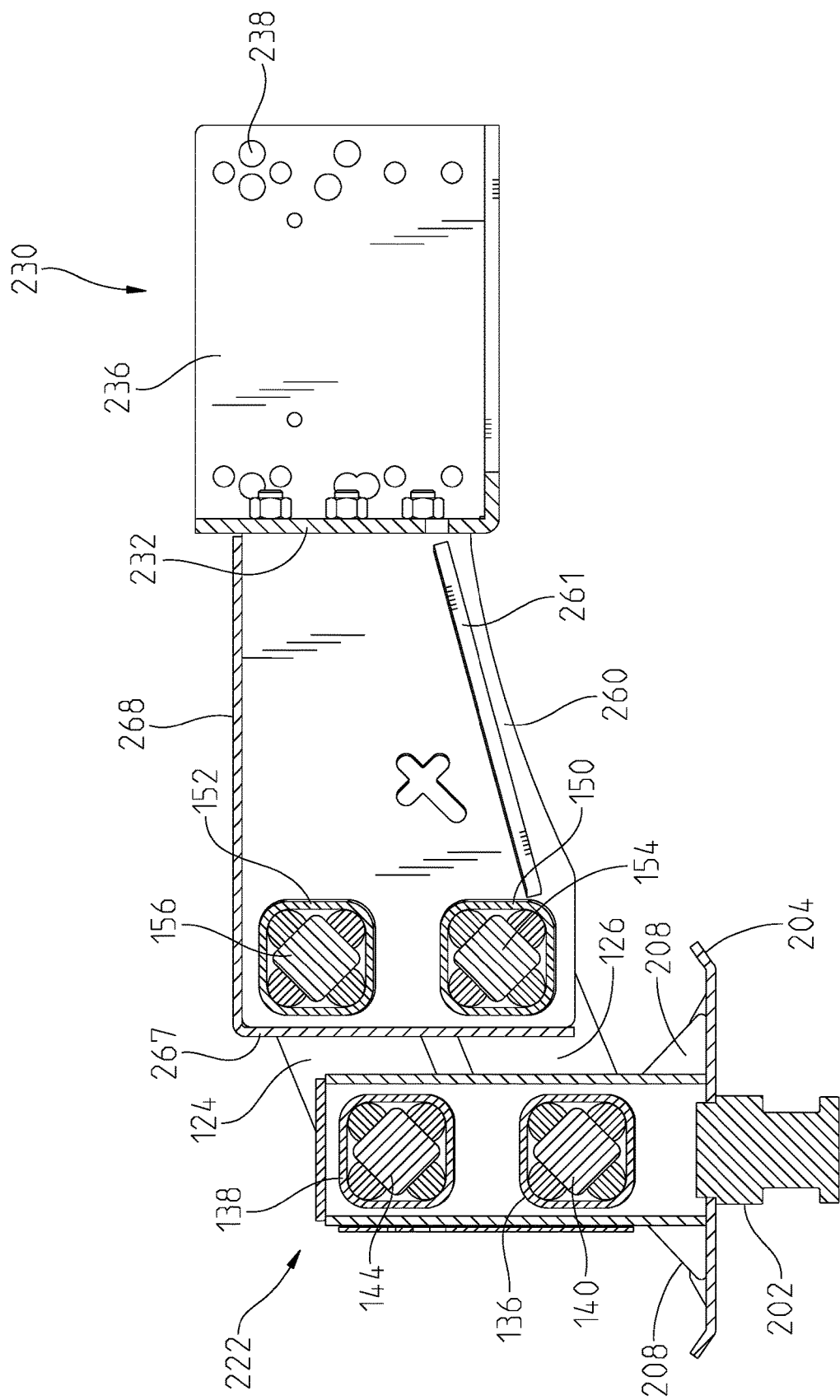
FIG. 24 is a side section view 24-24 of the torsion coupler in FIG. 22.
Figure 25:
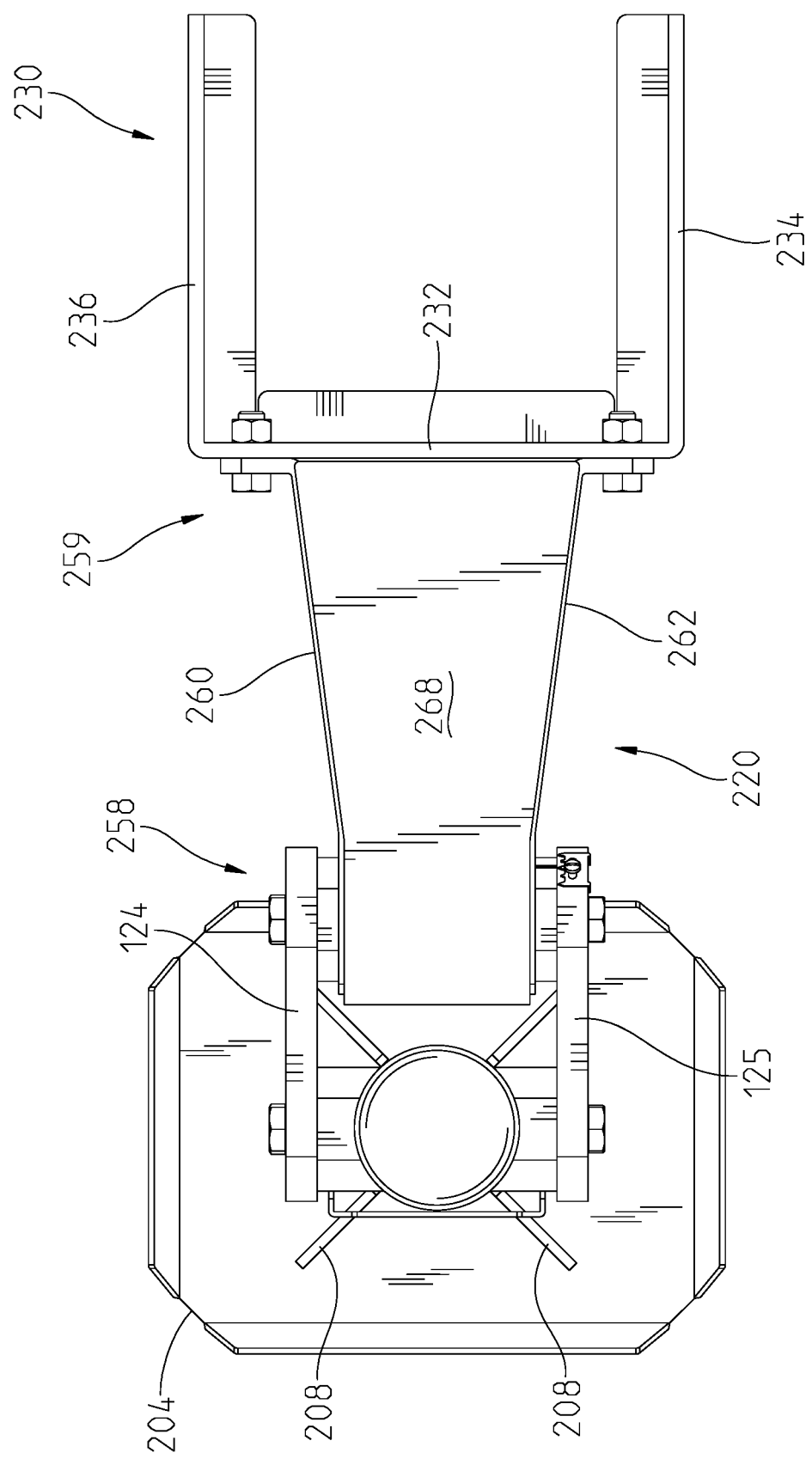
FIG. 25 is a top view of the torsion coupler in FIG. 22.

An alternate embodiment of the coupler 200 is disclosed in FIGS. 22-25. The cpi[;er 200 shares many components with the coupler 100 shown in FIGS. 9-21. Instead of a ball pocket 130, the coupler 200 has a kingpin 202 and a plate 204 that are affixed to a lower portion 222. The kingpin 202 and a plate 204 allow the coupler 200 to be affixed to a towing vehicle having a vehicle-mounted king pin receiver. The lower portion 222 is shown as a tubular member in FIG. 24, but it is contemplated that it is made from a solid component, rail, or channel. Gussets 208 extend between the plate 204 and the lower portion 222 to provide strength to the kingpin 202 and a plate 204. The gussets 208 are affixed through welding or other metal joining methods. The coupler 200 has a pin box assembly 220 that has a mounting end 259 and a torsion end 258. The pin box assembly 220 is designed to attach to the frame of a trailer (not shown) using fasteners. The torsion end 258 uses the same torsion tubes 150, 152 and corresponding torsion bars 154, 156 as the coupler 100 and the lower portion 222 uses the same torsion tubes 136, 138 and corresponding torsion bars 140, 144 as the coupler 100. The same torsion arms 124, 125, 126, 127 connect the lower portion 222 to the torsion end 258 of the pin box assembly 220. As is shown in FIG. 23, the axes 128, 148, 188, and 186 are in the same orientation as used with the coupler 100. Central axis 128 is aligned with the kingpin 202. The pin box assembly 220 has sides 260, 262 with a center wall portion 268 that is joined to a front wall portion 267. The front wall portion 267 and center wall portion 268 may be formed from the same sheet of material, as shown in FIG. 24. Similar to the coupler 100, the torsion tubes 150, 152 are affixed to the sides 260, 262. The sides 260, 262 may include a stiffening rib 261, shown in FIG. 24. The sides 260, 262 are affixed to the center wall portion 268 and front wall portion 267, commonly through welding or other metal joining processes. The stiffening rib 261 is a short wall affixed to the corresponding side 260, 262 that reduces warpage or buckling.

A frame bracket 230 may be used with the coupler 200. In this case, the mounting end 259 is affixed to a frame bracket 230 that can be affixed to the trailer frame (not shown). Depending on the type of trailer frame, the frame bracket 230 may be used connect the coupler 200 to the trailer by providing a compatible mounting surface. The frame bracket 230 has a front-facing portion 232 and side portions 234, 236. The side portions 234, 236 have apertures 238 that align to different styles of trailer frames. The front-facing portion 232 has apertures 240 that allow the mounting end 259 to be affixed thereto with fasteners.

It is understood that while certain aspects of the disclosed subject matter have been shown and described, the disclosed subject matter is not limited thereto and encompasses various other embodiments and aspects. No specific limitation with respect to the specific embodiments disclosed herein is intended or should be inferred. Modifications may be made to the disclosed subject matter as set forth in the following claims.

What is claimed is:

1. A torsion suspension coupler adapted to be affixed to a trailer and removably coupled to a towing vehicle having a vehicle-mounted hitch, said coupler comprising:
   a lower assembly having an elongate tubular member with a centrally located central axis, said lower assembly adapted to affix to said vehicle-mounted hitch, said lower assembly having a first torsion tube affixed to said elongate tubular member of said lower assembly with a centrally located first axis and a second torsion tube affixed to said lower assembly with a centrally located second axis, said first and second axes each orthogonally located with respect to said central axis, said first and second axes being parallel, said first torsion tube having a first torsion bar held therein and resisting rotation with respect to said first torsion tube, said second torsion tube having a second torsion bar held therein and resisting rotation with respect to said second torsion tube, said lower assembly has a kingpin and a plate affixed thereto;
   a pin box assembly adapted to be affixed to said trailer, said pin box assembly having a torsion end and an attachment end, said torsion end having a third torsion tube affixed thereto with a centrally located third axis, said torsion end having a fourth torsion tube affixed thereto with a centrally located fourth axis, said third and fourth axes being parallel, said third torsion tube having a third torsion bar held therein and resisting rotation with respect to said third torsion tube, said fourth torsion tube having a fourth torsion bar held therein and resisting rotation with respect to said fourth torsion tube, said third and fourth axes orthogonally located with respect to a pin box axis;
   a lower torsion arm affixed to a terminal end of said first torsion bar and affixed to a terminal end of said third torsion bar, an upper torsion arm affixed to a terminal end of said second torsion bar and affixed to a terminal end of said fourth torsion bar, said upper and lower torsion arms coupling said lower assembly to said pin box assembly; and
   said upper and lower torsion arms rotatable between an unloaded position and a loaded position, said torsion arms being biased toward said unloaded position, said upper and lower torsion arms remaining parallel between said loaded and said unloaded position, said central axis and said pin box axis remaining parallel.

2. The torsion suspension coupler of claim 1, wherein said lower assembly has a ball pocket adapted to receive a vehicle-mounted ball on said vehicle-mounted hitch.

3. The torsion suspension on coupler of claim 1, wherein said pin box assembly is comprised of side plates, said third and fourth torsion tubes extending therethrough and affixed thereto, said pin box assembly further comprising a top plate having a front wall portion, a center wall portion, and a rear wall portion, said side plates affixed to said top plate.

4. The torsion suspension coupler of claim 3, when said torsion arms are in said unloaded position, said lower assembly is closer to said front wall portion than when said torsion arms are in said loaded position.

5. The torsion suspension coupler of claim 1, further comprising a load indicator to indicate the position of said torsion arms between said loaded and said unloaded positions.

6. A torsion suspension coupler adapted to be affixed to a trailer, said coupler comprising:
   a lower assembly having a centrally located central axis, said lower assembly having a first torsion tube affixed thereto with a centrally located first axis and a second torsion tube affixed to said lower assembly with a centrally located second axis, said first and second axes each intersecting said central axis, said first and second axes being parallel, said first torsion tube having a first torsion bar held therein and resisting rotation with respect to said first torsion tube, said second torsion tube having a second torsion bar held therein and resisting rotation with respect to said second torsion tube;
   a pin box assembly adapted to be affixed to said trailer, said pin box assembly having a third torsion tube affixed thereto with a centrally located third axis, said pin box assembly having a fourth torsion tube affixed thereto with a centrally located fourth axis, said third and fourth axes being parallel, said third torsion tube having a third torsion bar held therein and resisting rotation with respect to said third torsion tube, said fourth torsion tube having a fourth torsion bar held therein and resisting rotation with respect to said fourth torsion tube, said pin box assembly adapted to be fastened to said trailer, said third and fourth axes intersecting a pin box axis;
   a lower torsion arm affixed to said first torsion bar and affixed to said third torsion bar, an upper torsion arm affixed to said second torsion bar and affixed to said fourth torsion bar, said upper and lower torsion arms coupling said lower assembly to said pin box assembly; and
   said upper and lower torsion arms rotatable between an unloaded position and a loaded position, said torsion arms being biased toward said unloaded position, said upper and lower torsion arms remaining parallel between said loaded and said unloaded position, said central axis and said pin box axis remaining parallel.

7. The torsion suspension coupler of claim 6, wherein said lower assembly has a kingpin and a plate affixed thereto.

8. The torsion suspension coupler of claim 6, wherein said lower assembly has a ball pocket adapted to receive a vehicle-mounted ball.

9. The torsion suspension coupler of claim 8, wherein said pin box assembly is comprised of side plates, said third and fourth torsion tubes extending therethrough and affixed thereto, said pin box assembly further comprising a top plate having a front wall portion, a center wall portion, and a rear wall portion, said side plates affixed to said top plate.

10. The torsion suspension coupler of claim 9, when said torsion arms are in said unloaded position, said lower assembly is closer to said front wall portion than when said torsion arms are in said loaded position.

11. The torsion suspension coupler of claim 6, further comprising a load indicator to indicate the position of said torsion arms between said loaded and said unloaded positions.

12. A torsion suspension coupler comprising:
   a lower assembly having a first torsion tube affixed thereto with a centrally located first axis and a second torsion tube affixed to said lower assembly with a centrally located second axis, said first and second axes being parallel, said first torsion tube having a first torsion bar held therein and resisting rotation with respect to said first torsion tube, said second torsion tube having a second torsion bar held therein and resisting rotation with respect to said second torsion tube;
   a pin box assembly having a third torsion tube affixed thereto with a centrally located third axis, said pin box assembly having a fourth torsion tube affixed thereto with a centrally located fourth axis, said third and fourth axes being parallel, said third torsion tube having a third torsion bar held therein and resisting rotation with respect to said third torsion tube, said fourth torsion tube having a fourth torsion bar held therein and resisting rotation with respect to said fourth torsion tube;
   a lower torsion arm affixed to a terminal end of said first torsion bar and affixed to a terminal end of said third torsion bar, an upper torsion arm affixed to a terminal end of said second torsion bar and affixed to a terminal end of said fourth torsion bar; and
   said upper and lower torsion arms rotatable between an unloaded position and a loaded position, said torsion arms being biased toward said unloaded position, said upper and lower torsion arms remaining parallel between said loaded and said unloaded position.

13. The torsion suspension coupler of claim 12, wherein said lower assembly having a centrally located central axis, said first and second axes intersecting said central axis.

14. The torsion suspension coupler of claim 13, wherein said third and fourth axes intersecting a pin box axis, said central axis and said pin box axis remaining parallel.

15. The torsion suspension coupler of claim 12, wherein said pin box assembly is comprised of side plates, said third and fourth torsion tubes extending therethrough and affixed thereto, said pin box assembly further comprising a top plate having a front wall portion, a center wall portion, and a rear wall portion, said side plates affixed to said top plate.

16. The torsion suspension coupler of claim 15, when said torsion arms are in said unloaded position, said lower assembly is closer to said front wall portion than when said torsion arms are in said loaded position.

17. The torsion suspension coupler of claim 12, further comprising a load indicator to indicate the position of said torsion arms between said loaded and said unloaded positions.

18. The torsion suspension coupler of claim 12, wherein said upper and lower torsion arms couple said lower assembly to said pin box assembly.

* * * * *